(12) United States Patent
Koo et al.

(10) Patent No.: US 12,292,767 B2
(45) Date of Patent: May 6, 2025

(54) ELECTRONIC DEVICE WITH HINGE UNIT

(71) Applicant: SAMSUNG ELECTRONICS CO., LTD., Suwon-si (KR)

(72) Inventors: Younggwon Koo, Suwon-si (KR); Mijeong Song, Suwon-si (KR); Gun Lim, Suwon-si (KR); Hyunje Cho, Suwon-si (KR); Yongtaek Hong, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 209 days.

(21) Appl. No.: 18/078,395

(22) Filed: Dec. 9, 2022

(65) Prior Publication Data

US 2023/0147784 A1    May 11, 2023

Related U.S. Application Data

(63) Continuation of application No. PCT/KR2022/016771, filed on Oct. 30, 2022.

(30) Foreign Application Priority Data

Nov. 5, 2021  (KR) .......... 10-2021-0151235
Dec. 24, 2021  (KR) .......... 10-2021-0187131

(51) Int. Cl.
*G06F 1/16* (2006.01)
*E05D 3/12* (2006.01)

(52) U.S. Cl.
CPC ............ *G06F 1/1681* (2013.01); *E05D 3/122* (2013.01); *E05Y 2999/00* (2024.05)

(58) Field of Classification Search
CPC . G06F 1/1681; G06F 1/1618; E05Y 2999/00; E05D 3/122
See application file for complete search history.

(56) References Cited

U.S. PATENT DOCUMENTS 5,754,395 A    5/1998  Hsu et al.
6,175,492 B1   1/2001  Nobuchi et al.
(Continued)

FOREIGN PATENT DOCUMENTS

CN    210488467 U    5/2020
JP      5172935 B2   3/2013
(Continued)

OTHER PUBLICATIONS

International Search Report dated Feb. 10, 2023, issued in the corresponding PCT application No. PCT/KR2022/016771, 3 pp.

*Primary Examiner* — Sagar Shrestha
*Assistant Examiner* — Peter Krim
(74) *Attorney, Agent, or Firm* — CANTOR COLBURN LLP

(57) ABSTRACT

An electronic device includes a first housing including a display module including a display screen, a second housing rotatable with respect to the first housing to define a rotation angle therebetween, the second housing including a first door provided at one surface and a second door provided at a surface which is opposite to the one surface, a hinge unit configured to rotatably connect the first housing to the second housing, and a driving module connecting the hinge unit to each of the first door and second door, the driving module moveable together with rotation of the second housing with respect to the first housing, to open and close the first door and the second door. the driving module is configured to open the first door when the rotation angle is less than a first angle and open the second door when the rotation angle is greater than a second angle.

19 Claims, 14 Drawing Sheets

(56) References Cited

U.S. PATENT DOCUMENTS

| | | | |
|---|---|---|---|
| 10,627,874 B2 | 4/2020 | Lin et al. | |
| 2019/0250674 A1* | 8/2019 | Lin | G06F 1/1616 |
| 2020/0142456 A1* | 5/2020 | Hsu | G06F 1/203 |
| 2020/0310498 A1 | 10/2020 | Chiang et al. | |
| 2021/0373613 A1* | 12/2021 | Zhong | G06F 1/203 |
| 2022/0171439 A1* | 6/2022 | Lin | G06F 1/1681 |

FOREIGN PATENT DOCUMENTS

| | | |
|---|---|---|
| JP | 6068698 B1 | 1/2017 |
| KR | 1020080032554 A | 4/2008 |
| KR | 10-0926961 B1 | 11/2009 |
| KR | 1020140020128 A | 2/2014 |

\* cited by examiner

ELECTRONIC DEVICE WITH HINGE UNIT

CROSS-REFERENCE TO RELATED APPLICATIONS

This application is a PCT-Bypass Continuation application of International Application No. PCT/KR2022/016771 designating the United States, filed on Oct. 30, 2022, in the Korean Intellectual Property Receiving Office and claiming priority to Korean Patent Application No. 10-2021-0151235, filed on Nov. 5, 2021, and Korean Patent Application No. 10-2021-0187131, filed on Dec. 24, 2021, in the Korean Intellectual Property Office, the disclosures of which are incorporated by reference herein in their entireties.

BACKGROUND

1. Field

The disclosure relates to an electronic device including a hinge unit and a method of controlling the same.

2. Description of Related Art

Electronic devices have been developed to be usable in various forms. As technology develops, portable electronic devices, such as a smartphone, a laptop, and a tablet personal computer (PC), have been distributed. A hinge unit is a component to which a housing of an electronic device is rotatably connected. An electronic device may be used for various purposes by changing a shape of the hinge unit according to a usage environment.

For example, an electronic device, such as a laptop, may include an upper housing in which there is a display, and a lower housing in which there may be a keyboard or an input device. According to an angle between the upper housing and the lower housing, the electronic device may be foldable and unfoldable between transformed into a folded state that is convenient to carry and an unfolded state in which a display screen is exposed to the outside (e.g., outside of the electronic device). An electronic device, such as a convertible PC or a 2-in-1 PC, that has a clamshell mode where the electronic device is supported by an external support and a tablet mode where the electronic device is rotated 360 degrees from the folded state, has been launched.

SUMMARY

To increase portability of an electronic device, a thickness of the electronic device has been reduced by decreasing the width of the electronic device. However, for an implementation of a slim electronic device, a gap including internal components of the electronic device may become smaller, an area occupied by a means for dissipating heat (e.g., heat dissipating member) from the internal components may decrease, the electronic device may generate the heat, and the performance of the electronic device may decrease, thereby inconveniencing a user.

It may be difficult for an electronic device to secure heat dissipation performance for cooling the internal components and to implement a slim electronic device at the same time.

Various embodiments of the disclosure may provide an electronic device that includes a plurality of doors openable and closable (e.g., opened and closed) based on a rotation angle of a housing. Accordingly, a cooling path of internal components of the electronic device may be formed and a slim electronic device may be implemented.

The tasks to be solved by various embodiments of the disclosure are not limited to the foregoing, and other tasks not mentioned herein will be clearly understood by those skilled in the art from the following description.

According to an embodiment of the disclosure, an electronic device may include a first housing including a display module that displays a screen; a second housing including a first door provided on one surface and a second door provided on a surface opposite to the first door; a hinge unit configured to rotatably connect the first housing to the second housing; and a driving module configured to open and close the first door and the second door by interoperating with the hinge unit, where the driving module is configured to open the first door when a rotation angle that is an angle formed between the first housing and the second housing based on the hinge unit is less than a set first angle and to open the second door when the rotation angle is greater than a set second angle.

According to an embodiment of the disclosure, an electronic device may include a housing including a first housing including a first surface and a second surface opposite to the first surface, a second housing including a third surface and a fourth surface opposite to the third surface, a first door provided on the third surface and a second door provided on the fourth surface; a hinge unit configured to connect the first housing to the second housing and adjust a rotation angle, which is an angle formed between the first housing and the second housing, from a start angle at which the first surface and the fourth surface face each other to an end angle at which the second surface and the third surface face each other; and a driving module configured to open the first door when the rotation angle is less than a set first angle and to open the second door when the rotation angle is greater than a second angle, the second angle being equal to or greater than the first angle.

According to various embodiments, an electronic device may open and close at least one of a first door and a second door according to user's usage environment, based on a rotation angle of a housing that rotates by interoperating with a hinge unit, and accordingly, an internal component of the electronic device may be efficiently cooled.

Alternatively, according to various embodiments, the electronic device may provide a fluid path based on opening and closing of the first door and the second door, thereby decreasing the total width of the electronic device in a folded state and implementing a slim electronic device to improve portability.

Effects of the electronic device according to various embodiments are not limited to the foregoing, and other effects not mentioned herein will be clearly understood by those skilled in the art from the following description.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
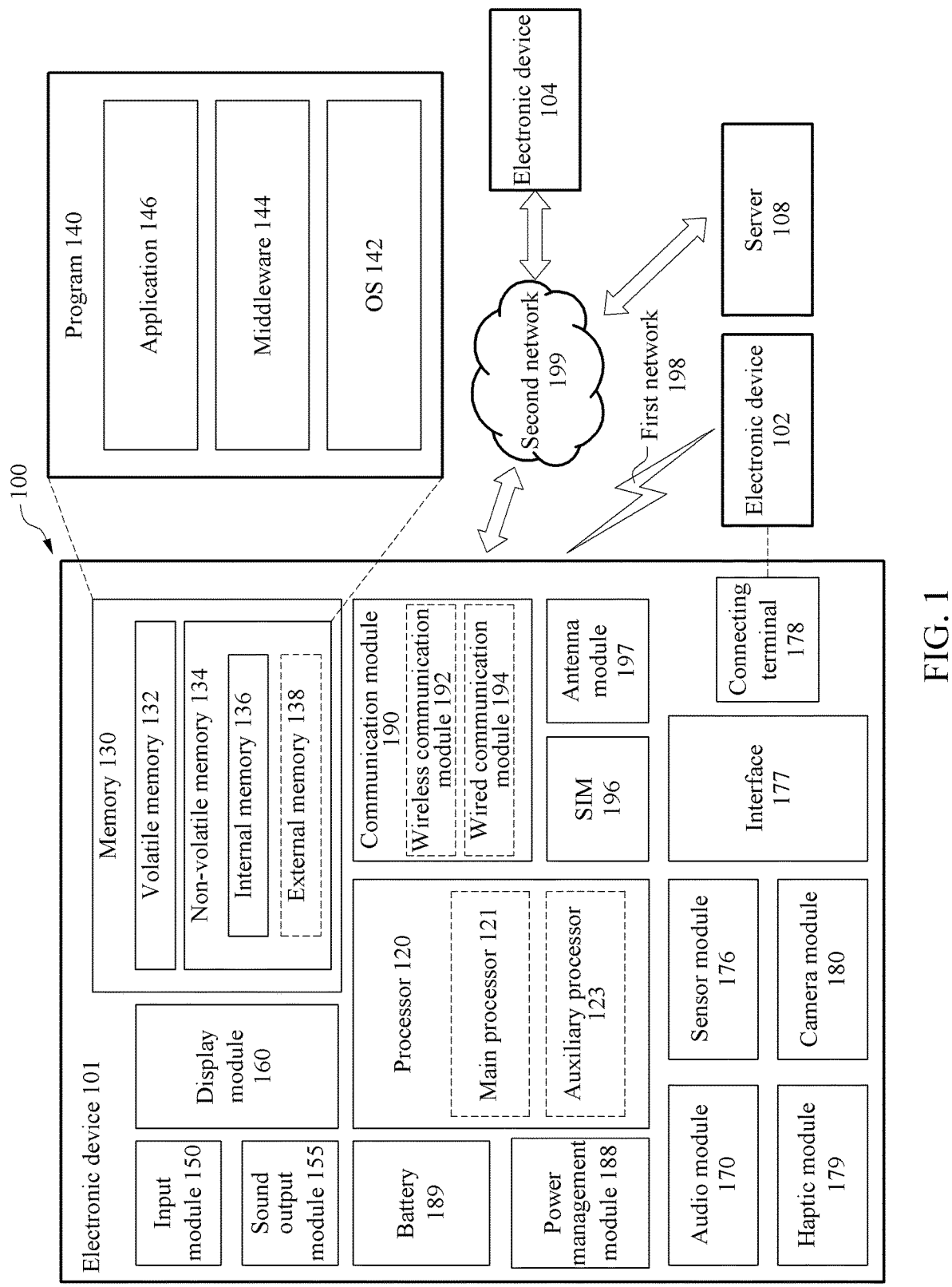
FIG. 1 is a block diagram illustrating an example electronic device in a network environment according to an embodiment.

Hereinafter, various embodiments will be described in greater detail with reference to the accompanying drawings. When describing the embodiments with reference to the accompanying drawings, like reference numerals refer to like elements and a repeated description related thereto will be omitted. As used herein, a reference number may indicate a singular element or a plurality of the element. For example, a reference number labeling a singular form of an element within the drawing figures may be used to reference a plurality of the singular element within the text of specification.

It should be appreciated that various embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components.

It is to be understood that a singular form of a noun corresponding to an item may include one or more of the things, unless the relevant context clearly indicates otherwise. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Terms such as "first", "second", or "first" or "second" may simply be used to distinguish the component from other components in question, and do not limit the components in other aspects (e.g., importance or order).

It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element. In contrast, if an element (e.g., a first element) is referred to as being "directly coupled with," "directly coupled to," "directly connected with," or "directly connected to" another element (e.g., a second element), it means that the element may be coupled with the other element without a third (intervening) element therebetween.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, a hinge unit 310 and an electronic device 201 including the hinge unit 310 according to various embodiments of the disclosure are described with reference to FIGS. 1 through 7C.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include any one or any combination of a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, and an antenna module 197. In some embodiments, at least one (e.g., the connecting terminal 178) of the above components may be omitted from the electronic device 101, or one or more other components may be added in the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another components (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101 (e.g., a user). The display module 160 may include, for example, a control circuit for controlling a display, a hologram device, or a projector and control circuitry to control a corresponding one of the display, the hologram device, and the projector. According to an embodiment, the display module 160 may include a touch sensor adapted to sense a touch, or a pressure sensor adapted to measure an intensity of a force incurred by the touch.

The audio module 170 may convert a sound into an electric signal or vice versa. According to an embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module)

or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to various embodiments, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band. As being 'adjacent to,' an element may be close in physical proximity, etc., without being limited thereto.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smarthome, smart city, smart car, or healthcare) based on 5G communication technology or IoT-related technology.

Figure 2A:
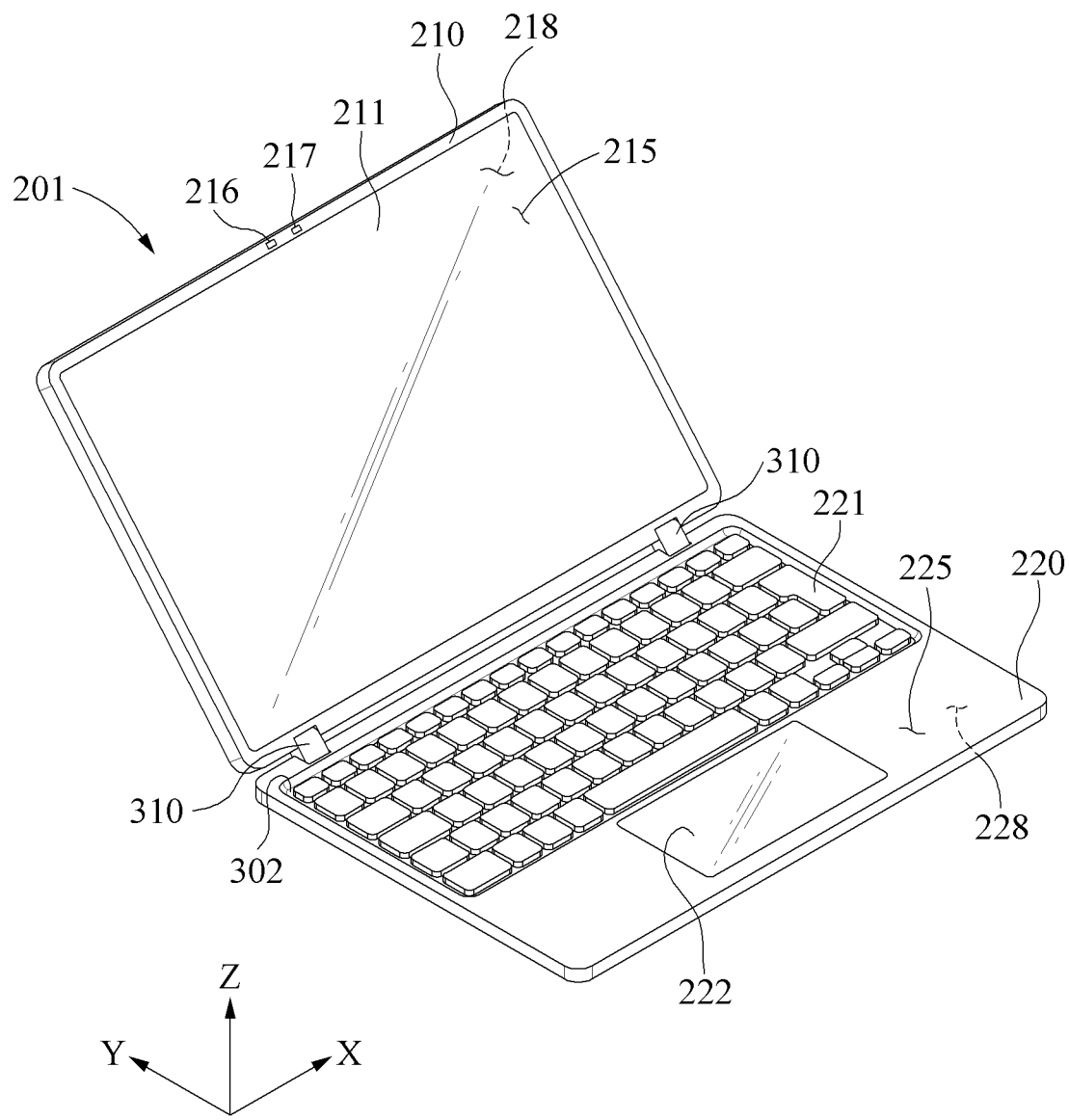
FIG. 2A is a perspective view illustrating an electronic device according to an embodiment.
Figure 2B:
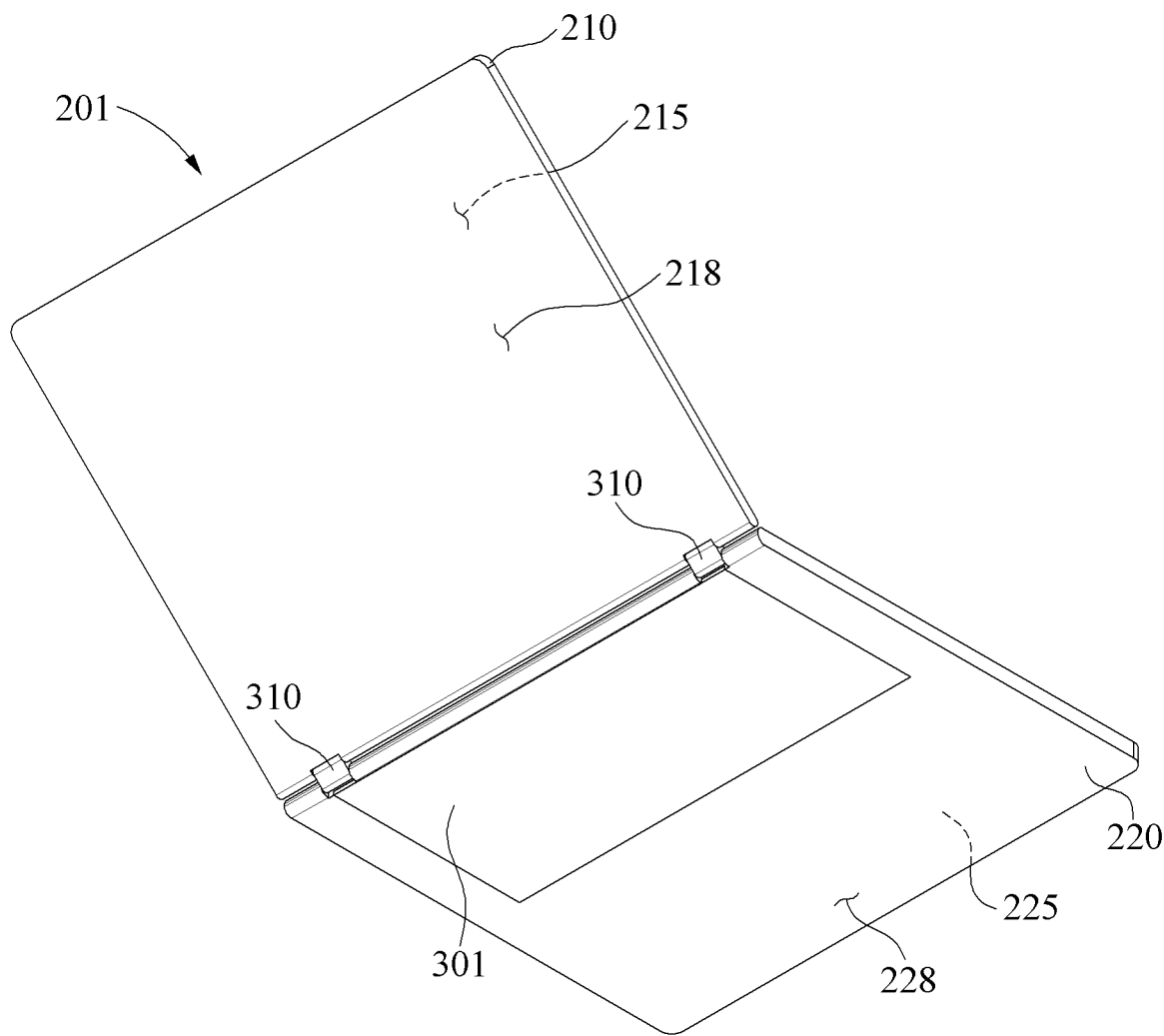
FIG. 2B is a perspective view illustrating an electronic device according to an embodiment.

FIG. 2A is a perspective view illustrating the electronic device 201 according to an embodiment, and FIG. 2B is a perspective view illustrating the electronic device 201 according to an embodiment.

Referring to FIGS. 2A and 2B, the electronic device 201 (e.g., the electronic device 101 of FIG. 1) according to various embodiments may include at least some of a first housing 210, a second housing 220, and a display module 211.

In an embodiment, the electronic device 201 may be a wireless communication device, a display device, a laptop computer, or a tablet personal computer (PC). For ease of description, although FIGS. 2A and 2B illustrate a notebook computer, which is a laptop PC, as an embodiment of the electronic device 201, the electronic device 201 is not limited thereto in the implementation and the electronic device 201 may be implemented as various types of electronic devices.

In an embodiment, the first housing 210 may form an external appearance of the electronic device 201. In an embodiment, the first housing 210 may include a first surface 215 that is one surface in a direction (e.g., −Y direction) and a second surface 218 opposite to the first surface 215. The first surface 215 may be formed where most regions are opened such that the display module 211 is exposed to the outside, and the display module 211 may define a display screen in a direction of the first surface 215.

In an embodiment, the second housing 220 may be rotatably connected with and foldable with respect to the first housing 210, via the hinge unit 310. The second housing 220 may include a third surface 228 that is one surface in a direction (e.g., −Z direction) and a fourth surface 225 opposite to the third surface 228. The second housing 220 may be formed to comprise a shape corresponding to the first housing 210, for example, the size and area (e.g. planar area) of the fourth surface 225 of the second housing 220 may correspond to the size and area (e.g., planar area) of the first surface 215 of the first housing 210.

In an embodiment, the second housing 220 may include a first door 301 provided on (or at) the third surface 228 and a second door 302 provided on (or at) the fourth surface 225. For example, the second door 302 may be formed to be connected to an input device 221 or formed as a single body with the input device 221, and the first door 301 may be disposed on a rear surface of the electronic device 201 opposite to the second door 302 of the second housing 220 which is at the front surface of the electronic device 201. The first door 301 and the second door 302 may be openable and closable relative to a remainder of the electronic device 201. In various embodiments, the first door 301 and the second door 302 may be opened and closed by interoperating with a rotation state of the first housing 210 and the second housing 220 relative to each other. That is, the first door 301 and the second door 302 may be variously openable and closeable together with rotation of the first housing 210 and the second housing 220 relative to each other. An opening and closing structure of the first door 301 and the second door 302 is described in detail with reference to FIG. 4A and thereafter.

In an embodiment, the second housing 220 may include the input device 221 and a touch pad 222 that are disposed on the fourth surface 225. In an embodiment, the input device 221 may be a keyboard or may be an input device including a touch recognition function and/or a display function. The fourth surface 225 of the second housing 220 may be formed such that the input device 221 and the touch pad 222 are exposed to the outside (e.g., outside of the electronic device 201). The input device 221 and the touch pad 222 may be exposed to the outside via the fourth surface 225 and may be manipulated the outside, such as by a user. The input device 221 and the touch pad 222 may be exposed to outside the fourth surface 225 via a groove defined in the second housing 220 by portions of the fourth surface 225. User manipulation information input via the input device 221 and the touch pad 222 may be provided to a processor (e.g., the processor 120 of FIG. 1).

In an embodiment, in the electronic device 201, a connection state between the first housing 210 and the second housing 220 may be changed according to a user's use state of the hinge unit 310. In various embodiments, a single hinge unit 310 may be at the center of a connection region between the first housing 210 and the second housing 220, or a plurality of hinge units 310 may be spaced apart from one another at the connection region between the first housing 210 and the second housing 220. The hinge unit 310 may rotatably connect the first housing 210 to the second housing 220. In an embodiment, the hinge unit 310 may be connected to or include a driving module 350 (of FIG. 3). The driving module 350 may open and close the first door 301 and the second door 302 by interoperating the various doors together with the hinge unit 310. The driving module 310 and the plurality of doors 301 and 302 are described in detail with reference to FIG. 3 and thereafter.

In an embodiment, in the electronic device 201, a relative connection state between the first housing 210 and the second housing 220 may change to be an "unfolded state" in which the electronic device 201 is unfolded to dispose the display module 211, the input device 221, and the touch pad 222 visually exposed to the outside, and a "folded state" in which the electronic device 201 is folded to dispose the first surface 215 of the first housing 210 and the fourth surface 225 of the second housing 220 facing each other such that the display module 211, the input device 221, and the touch pad 222 are not visible from outside the electronic device 201 which is folded. In various embodiments, the electronic device 201 may be driven in a plurality of use modes according to an angle between the first housing 210 and the second housing 220 in the unfolded state and may be a convertible PC or a 2-in-1 PC according to the use modes, the angles between the various housings, etc.

For example, in the electronic device 201 which is the convertible PC, the first housing 210 may rotate about a rotation axis of the electronic device 202 substantially up to a range of 360 degrees, based on the second housing 220. For example, the hinge unit 310 may adjust a rotation angle (e.g., a rotation angle θ of FIG. 4A), which is an angle between the first housing 210 and the second housing 220, from a start angle at which the first surface 215 and the fourth surface 225 face each other to an end angle at which the second surface 218 and the third surface 228 face each other (e.g., the first surface 215 and the fourth surface 225 face away each other). For example, the electronic device 201 may be driven in a clamshell mode or a laptop mode in which the rotation angle is in a range from the start angle (e.g., 0 degrees) to a set angle (e.g., 180 degrees), or the electronic device 201 may be driven in a tablet mode in which the rotation angle is in a range from the set angle to the end angle (e.g., 360 degrees). The user may use a single electronic device by transforming the single electronic device to various forms to meet a usage environment, and a usability of the electronic device 201 may be expanded.

In an embodiment, the first housing 210 and the second housing 220 may be separable from one another. For example, the first housing 210 and the second housing 220 may be integrally connected and rotatable with respect to each other via the hinge unit 310 that connects the first housing 210 to the second housing 220, or may be implemented as individual display devices capable of being combined with each other and separated from each other into the respective independent display elements.

In various embodiments, the display module 211 may generate and/or display visual information (e.g., text, video, and/or images) to outside the electronic device 201 (e.g., to the user). In an embodiment, the display module 211 may be connected to the first housing 210 and may be visually exposed to the outside of the electronic device 201 via the first surface 215 of the first housing 210. For example, the display module 211 may be seated on a recess formed in (or defined by portions of) the first surface 215 of the first housing 210 and may form most of the first surface 215.

In an embodiment, the display module 211 (e.g., the display module 160 of FIG. 1) may include a display panel and a protective glass (or a protective film or a window) which is stacked on the outer surface of the display panel to face the display panel. In an embodiment, the protective film is a thin film layer formed of (or including) a transparent material and may include a plastic film (e.g., a polyimide film) or thin film glass (e.g., ultra-thin glass (UTG)). In an embodiment, the display panel may include an unbreakable (UB)-type organic light-emitting diode (OLED) display (e.g., a curved display) that includes an OLED or a micro light-emitting diode (LED).

In an embodiment, a touch panel (not illustrated) may be formed at least a part of the display panel and the display panel may include an on-cell touch active matrix OLED (AMOLED) (OCTA)-type display. However, the types of the display panel are not limited thereto, and the display panel may be formed in various types (e.g., add-on type and in-cell type). In an embodiment, the display module 211 may include a digitizer panel (not illustrated) for detecting an input (e.g., a touch input or a hovering input) of an input device (e.g., a stylus pen). A digitizer may convert an analog coordinate of an input device (e.g., a stylus pen) into digital data to transfer the digital data to the processor (e.g., the processor 120 of FIG. 1). The processor 120 may detect the input (e.g., the touch input or the hovering input) of an input device (e.g., a stylus pen), based on the digital data input from a digitizer 260. Various components or layers of the electronic device 201 may be foldable, unfoldable, rotatable, etc. together with each other.

In an embodiment, when the display module 211 is visually exposed to outside the electronic device 201 via the first surface 215, an operation state of the display module 211 may change depending on the relative connection state of the second housing 220 to the first housing 210. For example, in the unfolded state, the display module 211 may display visual information to the user by being visually exposed to the outside. Conversely, in the folded state, the display module 211 may not be visible via the fourth surface 225 so as not to be visually exposed to the outside.

In an embodiment, the display module 211 may control the screen (e.g., display screen) to be turned on and off according to the unfolded state or the folded state of the electronic device 201 and/or the display module 211. For example, the display module 211 may control the screen to be turned off in the folded state to prevent unnecessary power consumption. Furthermore, the display module 211 may control a screen display direction according to a driving mode of the electronic device 201. That is, the screen of the display module 211 may be controlled together with unfolding and folding of the of the electronic device 201 and/or the display module 211. In an embodiment, the screen of the display module 211 may be automatically turned off and/or turned on by a state of the electronic device 201 and/or the display module 211 (e.g., folding and unfolding).

In an embodiment, the electronic device 201 may set a region connected to the second housing 220 as a lower part and display the screen based on an up direction (e.g., +Z direction) and a down direction (e.g., −Z direction). For example, in the tablet mode, the electronic device 201 may use a gyro sensor (not illustrated) of a sensor module (e.g., the sensor module 176 of FIG. 1) to detect the user's usage environment and the display module 211 may re-set the up and down directions based on the detected user's usage environment.

In an embodiment, a camera module 216 (e.g., the camera module 180 of FIG. 1) and a sensor module 217 (e.g., the sensor module 176 of FIG. 1) may be disposed in a space provided by the first housing 210, and at least a part of the regions of the camera module 216 and the sensor module 217 may be visually exposed via the first surface 215 of the first housing 210.

For example, the camera module 216 and the sensor module 217 may be visually exposed, together with the display module 211, to the user in the unfolded state of the first housing 210 and the second housing 220 and may not be visible from the electronic device 201 in the folded state in which the first surface 215 of the first housing 210 and the fourth surface 225 of the second housing 220 face each other.

In an embodiment, a microphone and a sensor device may be disposed in a space provided by the first housing 210. For example, a dual microphone may be disposed in the space provided by the first housing 210. For example, the sensor device may include a proximity sensor, a time of flight (TOF) sensor, or a light detection and ranging (LiDAR) sensor for identifying a position of the user.

Figure 3:
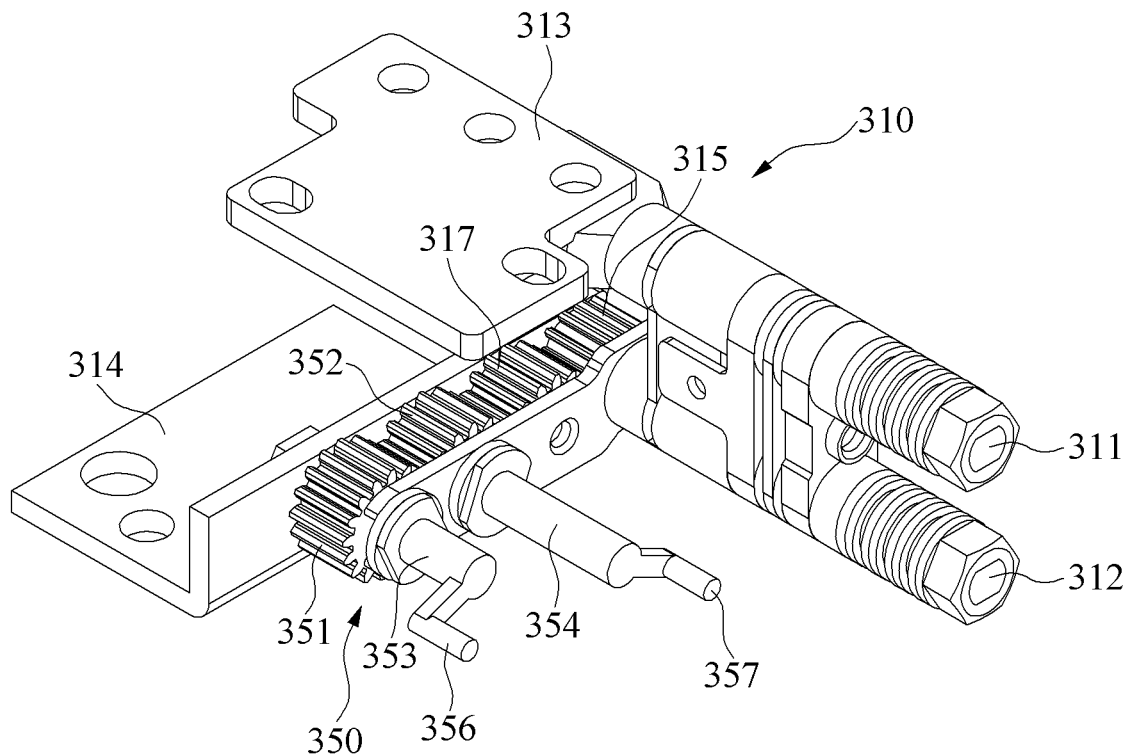
FIG. 3 is a perspective view illustrating a hinge unit according to an embodiment.

FIG. 3 is a perspective view illustrating the hinge unit 310 according to an embodiment.

Referring to FIG. 3, the hinge unit 310 according to various embodiments may include a pair of plates 313 and 314, a pair of hinge axes 311 and 312, a plurality of gears 315 and 317, and the driving module 350.

In an embodiment, the pair of plates 313 and 314 may include a first plate 313 connected to the first housing 210 and a second plate 314 connected to the second housing 220, and the pair of hinge axes 311 and 312 may include a first hinge axis 311 connected to the first housing 210 and a second hinge axis 312 connected to the second housing 220.

For example, the first plate 313 may rotate (e.g., be rotatable) based on the first hinge axis 311 and the second plate 314 may rotate based on the second hinge axis 312. Each of the first plate 313 and the second plate 314 may rotate by interoperating with a hinge gear 315.

In an embodiment, the driving module 350 may open and close a first door (e.g., the first door 301 of FIG. 2B) and a second door (e.g., the second door 302 of FIG. 2A) by interoperating with the hinge unit 310. In an embodiment, the respective doors of the electronic device 201 may be automatically (or simultaneously) opened or closed by a state of the electronic device 201 and/or the display module 211 (e.g., folding and unfolding). The driving module 350 may be connected to the hinge unit 310 via an intermediate gear 317 of the hinge unit 310. In various embodiments, the driving module 350 may be inside the second housing 220, which includes the plurality of doors 301 and 302, and may open and close the plurality of doors 301 and 302 by interoperating with the hinge unit 310. In an embodiment, the driving module 350 may be moveable together with rotation of the second housing 220 with respect to the first housing 210, to open and close the first door 301 and the second door 302. Here, the rotation angle which is less than a first angle may open the first door 301, and the rotation angle which is greater than a second angle may open the second door.

In an embodiment, the driving module 350 may include a first gear 351 and a second gear 352 that rotate by interoperating with the intermediate gear 317 of the hinge unit 310.

In an embodiment, the first gear 351 may rotate by engaging with the second gear 352 and may be connected to a first shaft 353. The first shaft 353 may extend in one direction (e.g., +X direction) from the rotation axis of the first gear 351 and may include a first shaft arm 356. The first shaft 353 (and the first shaft arm 356) may rotate about the rotation axis, together with rotation of the first gear 351. In an embodiment, a respective gear may be rotatable by interoperating with the hinge unit 310, a respective shaft may include a shaft arm offset from a rotation axis of the gear, and a respective support member may include a slot along which the shaft arm moves together with rotation of the gear, where the support member may be connected to the first door 301 and the second door 302.

In an embodiment, the second gear 352 may rotate by engaging with the intermediate gear 317 and may be connected to a second shaft 354. The second shaft 354 may extend in one direction (e.g., +X direction) from the rotation axis of the second gear 352 and may include a second shaft arm 357.

In an embodiment, a gear ratio of at least some of the first gear 351 and the second gear 352 may differ from a gear ratio of the hinge gear 315, and a rotation angle of at least one of the first gear 351 and the second gear 352 may differ from a rotation angle of the hinge gear 315. For example, if the rotation angle between the first gear 351 and the second gear 352 is less than the rotation angle of the hinge gear 315, the electronic device 201 may implement a structure in which the plurality of doors 301 and 302 is interoperated to be opened and closed in a limited internal space of the second housing 220. In various embodiments, the gear ratios of the first gear 351 and the second gear 352 may differ from one another.

The hinge unit 310 and the driving module 350 illustrated in FIG. 3 may be illustrations for describing the hinge unit 310 that opens and closes the plurality of doors 301 and 302 by interoperating with a rotation of the first housing 210 and the second housing 220. However, the structure of the hinge unit 310 and the driving module 350 is not limited thereto in the implementation, and the hinge unit 310 and the driving module 350 may be implemented in various structures.

For example, the driving module 350 according to another embodiment may include a single gear (not illustrated) connected to the plurality of shaft arms 356 and 357, and the plurality of shaft arms 356 and 357 may engage with the plurality of doors 301 and 302 to open and close the plurality of doors 301 and 302 based on a rotation of the single gear (not illustrated).

The driving module 350 according to another embodiment may include a cam member (not illustrated) that opens and closes the plurality of doors 301 and 302, and the cam member (not illustrated) may open and close the plurality of doors 301 and 302 while moving in a vertical direction (e.g., +/−Z direction) by interoperating with the rotation of the hinge unit 310.

The driving module 350 according to another embodiment may include a power device (not illustrated), such as a motor, and the power device (not illustrated) may open and close the plurality of doors 301 and 302. The driving module 350 according to an embodiment may be controlled by electrical connection to the processor (e.g., the processor 120 of FIG. 1) or a memory (e.g., the memory 130 of FIG. 1).

The driving module 350 according to another embodiment may include an elastic member (not illustrated), and the driving module 350 may open and close the plurality of doors 301 and 302 by controlling an elastic force and an elastic direction of the elastic member (not illustrated).

The driving module 350 according to another embodiment may include a magnetic body (not illustrated) comprising magnetic force, or an electromagnetic unit (not illustrated) generating electromagnetic force. The magnetic body (not illustrated) or the electromagnetic unit (not illustrated) may be controlled by the hinge unit 310 or the processor and may open and close the plurality of doors 301 and 302 comprising magnetism by pushing or pulling the plurality of doors 301 and 302.

In various embodiments, other than the structures of the driving module 350 described above, the driving module 350 according to various embodiments of the disclosure may be implemented in various structures in which the plurality of doors 301 and 302 is opened and closed in response to a rotation angle θ of a housing, and other configurations of the driving module 350 may be added or changed within a range that can be easily derived or modified by those skilled in the art.

FIGS. 4A through 4E illustrate various states of the electronic device 201 according to an embodiment.

Referring to FIGS. 4A through 4E, the electronic device 201 according to various embodiments may transform into a plurality of states A1, A2, A3, A4, and A5 based on the rotation angle θ between the first housing 210 and the second housing 220, and the plurality of doors 301 and 302 may be open and closed based on the plurality of states A1, A2, A3, A4, and A5 of the electronic device 201.

In an embodiment, the electronic device 201 may open and close the first door 301 and the second door 302 by interoperating with the rotation angle θ, which is an angle between the first housing 210 and the second housing 220. For example, the rotation angle θ may be an angle at which a virtual surface substantially parallel to one surface (e.g., the first surface 215 or the second surface 218) of the first housing 210 is formed, based on a virtual surface substantially parallel to one surface (e.g., the third surface 228 or the fourth surface 225) of the second housing 220. Alternatively, the rotation angle θ may be an angle formed between the first housing 210 and the second housing 220, based on the hinge unit 310.

In an embodiment, the first door 301 may be connected to a first support member 361 and the second door 302 may be connected to a second support member 362. The first support member 361 and the second support member 362 may be an element of a driving module (e.g., the driving module 350 of FIG. 3). The first support member 361 and the second support member 362 may be pressed or engaged by interoperating with the rotation of the hinge unit 310 and may open and close the first door 301 and/or the second door 302. An embodiment of specific driving of the first support member 361 and the second support member 362 is described in detail starting with reference to FIG. 5A and thereafter.

Figure 4A:
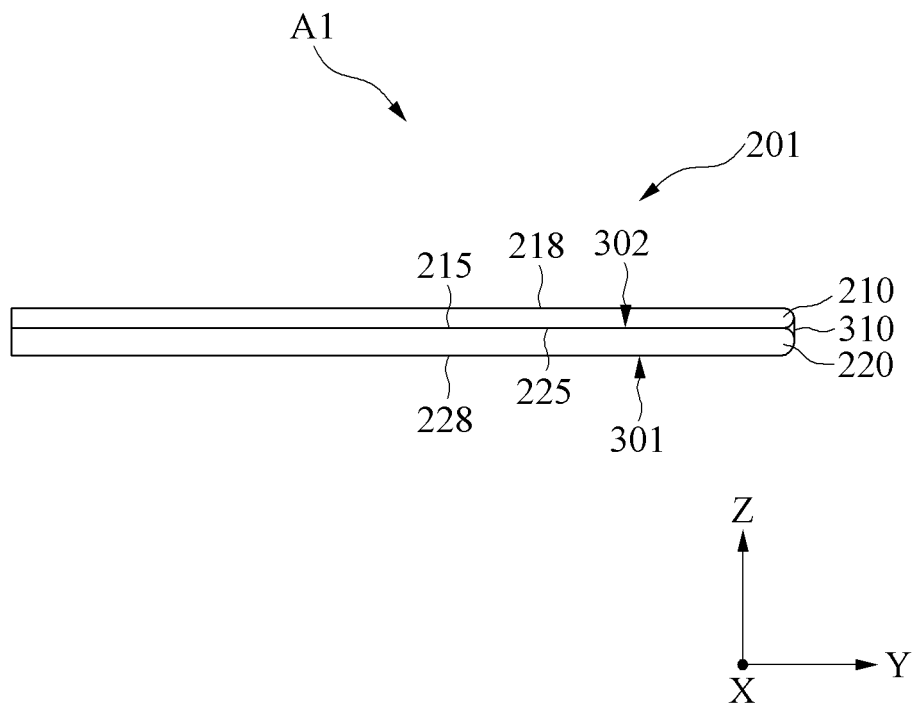
FIG. 4A illustrates a state of an electronic device according to an embodiment.

In an embodiment, referring to FIG. 4A, a first state A1 of the electronic device 201 may be a state in which the first surface 215 of the first housing 210 and the fourth surface 225 of the second housing 220 face each other. In an embodiment, a state in which the rotation angle θ of the electronic device 201 is a start angle (e.g., 0 degrees) may be the first state A1. The first state A1 may be a folded state (e.g., completely folded or in folded) of the electronic device 201 or may be a state in which the display module 211 and the input device 221 of the electronic device 201 are not visible. In an embodiment, the first state A1 may be a state in which the driving of all or a part of the electronic device 201 has temporarily stopped or finished or may be a state in which power consumption is minimized. In the first state A1, the pair of plates (e.g., the pair of plates 313 and 314 of FIG. 3) of the hinge unit 310 may be substantially parallel to each other and the first door 301 and the second door 302 may be in a closed state. As being in a closed state, a respective door may be coplanar with an outer surface of the electronic device 201, without being limited thereto.

Figure 4B:
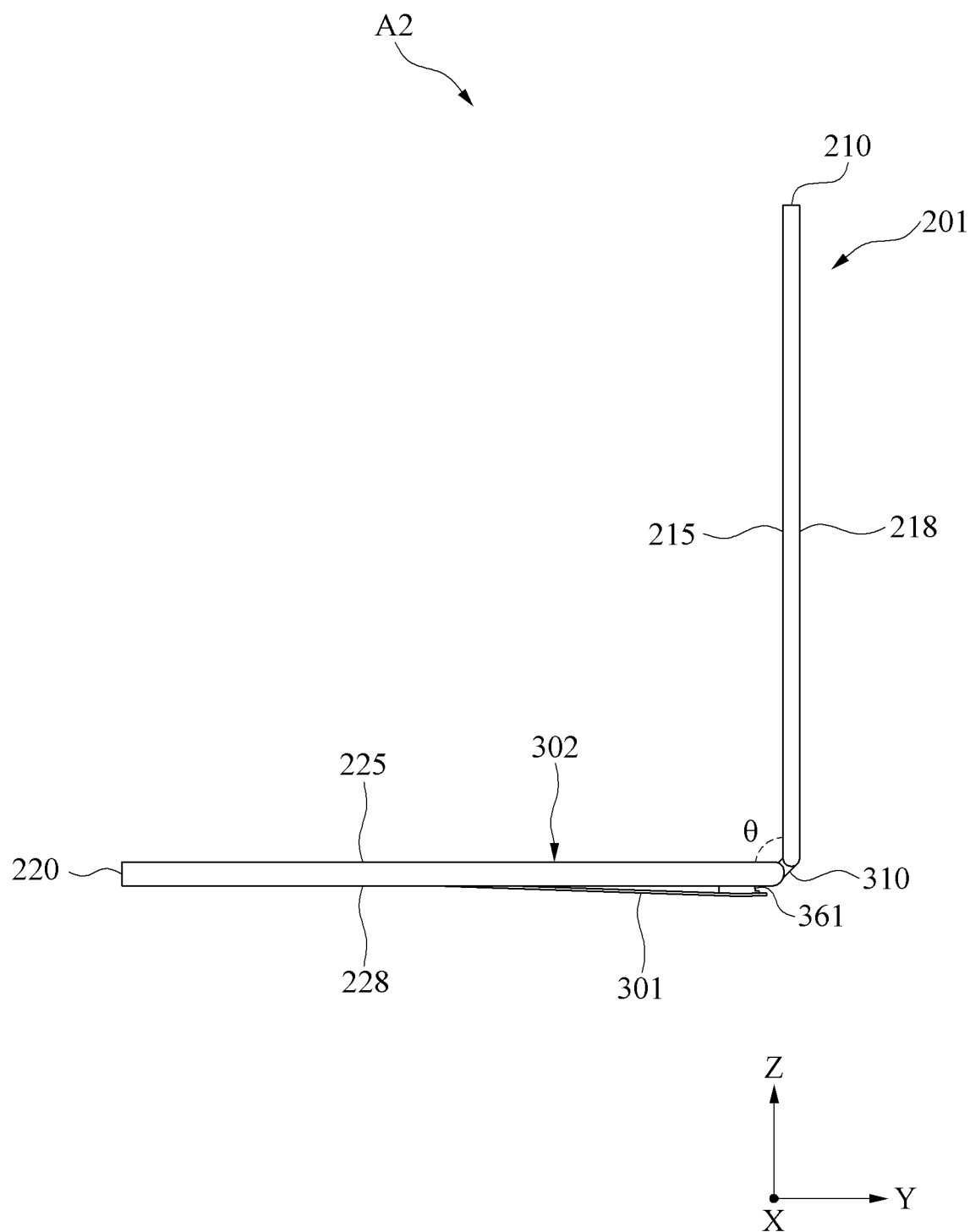
FIG. 4B illustrates a state of an electronic device according to an embodiment.

In an embodiment, referring to FIG. 4B, a second state A2 of the electronic device 201 may be a state in which the rotation angle θ is between the start angle (e.g., 0 degrees) and an intermediate angle (e.g., 180 degrees) or may be a state in which the first surface 215 of the first housing 210 and the fourth surface 225 of the second housing 220 are substantially perpendicular or adjacent thereto. For example, the second state A2 of the electronic device 201 may be an unfolded state in a clamshell mode. In an embodiment, the second state A2 may be a state in which the electronic device 201 is on an external support (not illustrated) or may be, for example, a state in which the third surface 228 of the electronic device 201 is supported on a top surface of an external support (not illustrated), such as a desk or a table. In an embodiment, the electronic device 201 which is supported by an external support, may dispose a surface (e.g., rear surface opposite to the front surface) facing the external support, and movement of the driving module 350 may dispose the first door 301 protruded out of the second housing 220 and contacting the external support.

In an embodiment, in the electronic device 201 that is in the second state A2, the first door 301 may be open. The first door 301 may be open and spaced apart from the third surface 228 of the second housing 220, and via the first door 301 which is open, external air may be introduced into the second housing 220, or internal air may discharge to the outside. For example, the first door 301 may be open in the clamshell mode and form a cooling path of a component of the electronic device 201, which is inside the second housing 220.

Figure 4C:
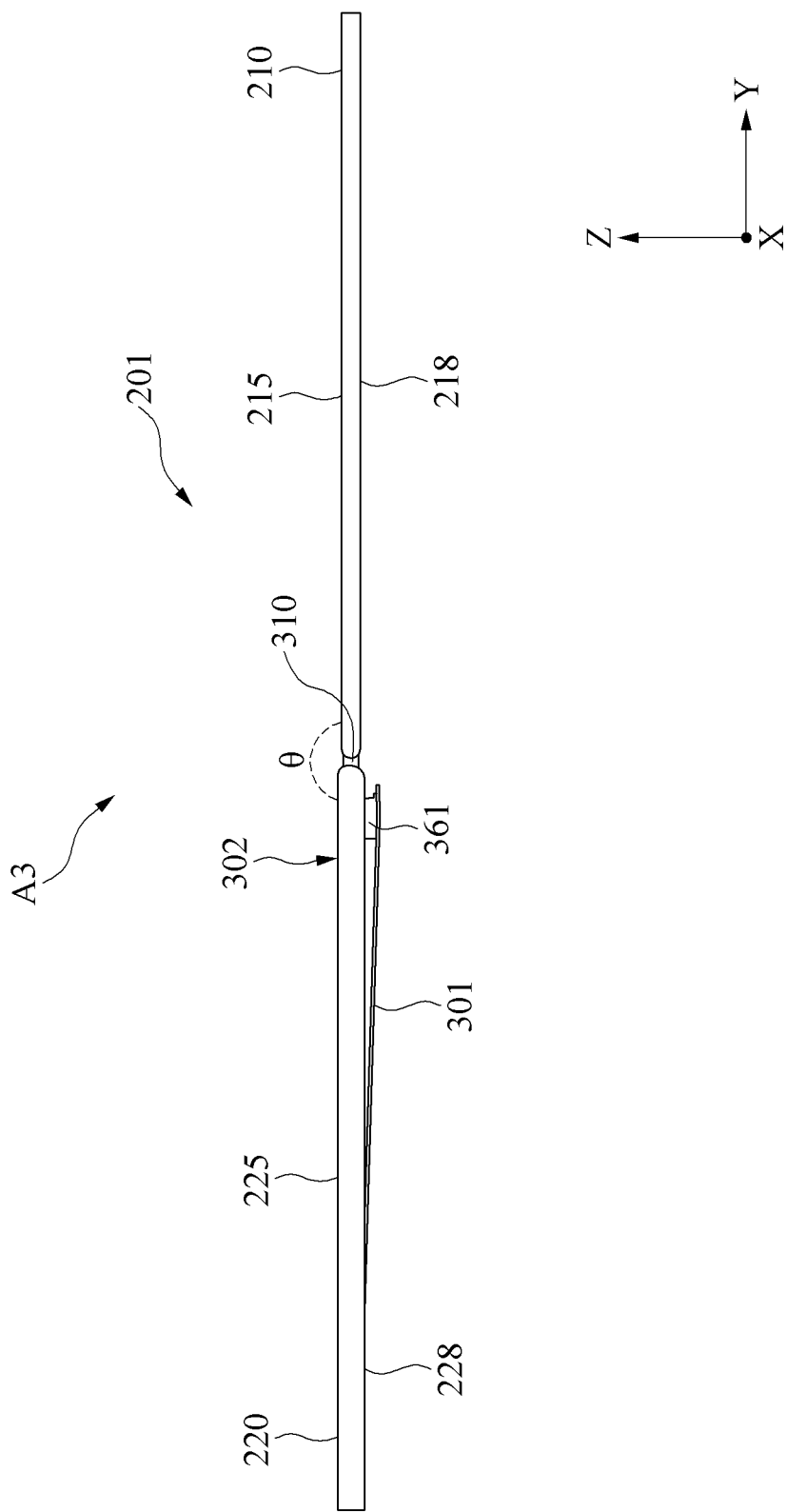
FIG. 4C illustrates a state of an electronic device according to an embodiment.

In an embodiment, referring to FIG. 4C, a third state A3 of the electronic device 201 may be an unfolded state in a horizontal mode (e.g., flat). For example, the third state A3 of the electronic device 201 may be a state in which the rotation angle θ is an intermediate angle (e.g., 180 degrees) or adjacent thereto, or may be a state in which the first surface 215 of the first housing 210 and the fourth surface 225 of the second housing 220 are substantially horizontal or adjacent thereto. As being 'adjacent to,' an element may be close or substantially equal to a value, etc., without being limited thereto. In an embodiment, the first surface 215 of the first housing 210 and the fourth surface 225 of the second housing 220 may be coplanar with each other. In an embodiment, the third state A3 may be a state in which the electronic device 201 is on the external support (not illustrated) or may be, for example, a state in which the second surface 218 and the third surface 228 of the electronic device 201 are supported on the top surface of an external support (not illustrated), such as a desk or a table.

In an embodiment, in the electronic device 201 that is in the third state A3, the first door 301 may be open. The electronic device 201 that is in the third state A3 may be in a state in which the unfolded state of the first door 301 (e.g., open state of the first door 301) is maintained as the rotation angle θ increases. The third state A3 may include the first door 301 is a maximally open state, such as being maximum at the intermediate angle (e.g., 180 degrees). Alternatively, the electronic device 201 that is in the third state A3 may be in a state in which the first door 301 is opened as the rotation angle θ decreases from the electronic device 201 that is in a fourth state A4. Although not illustrated, in various embodiments, the degree of the opening of the first door 301 of the electronic device 201 may change as the rotation angle θ between the second state A2 and the third state A3 changes. That is, the first door 301 which is open may expose the inside of the second housing 220 to outside the electronic device 201.

Figure 4D:
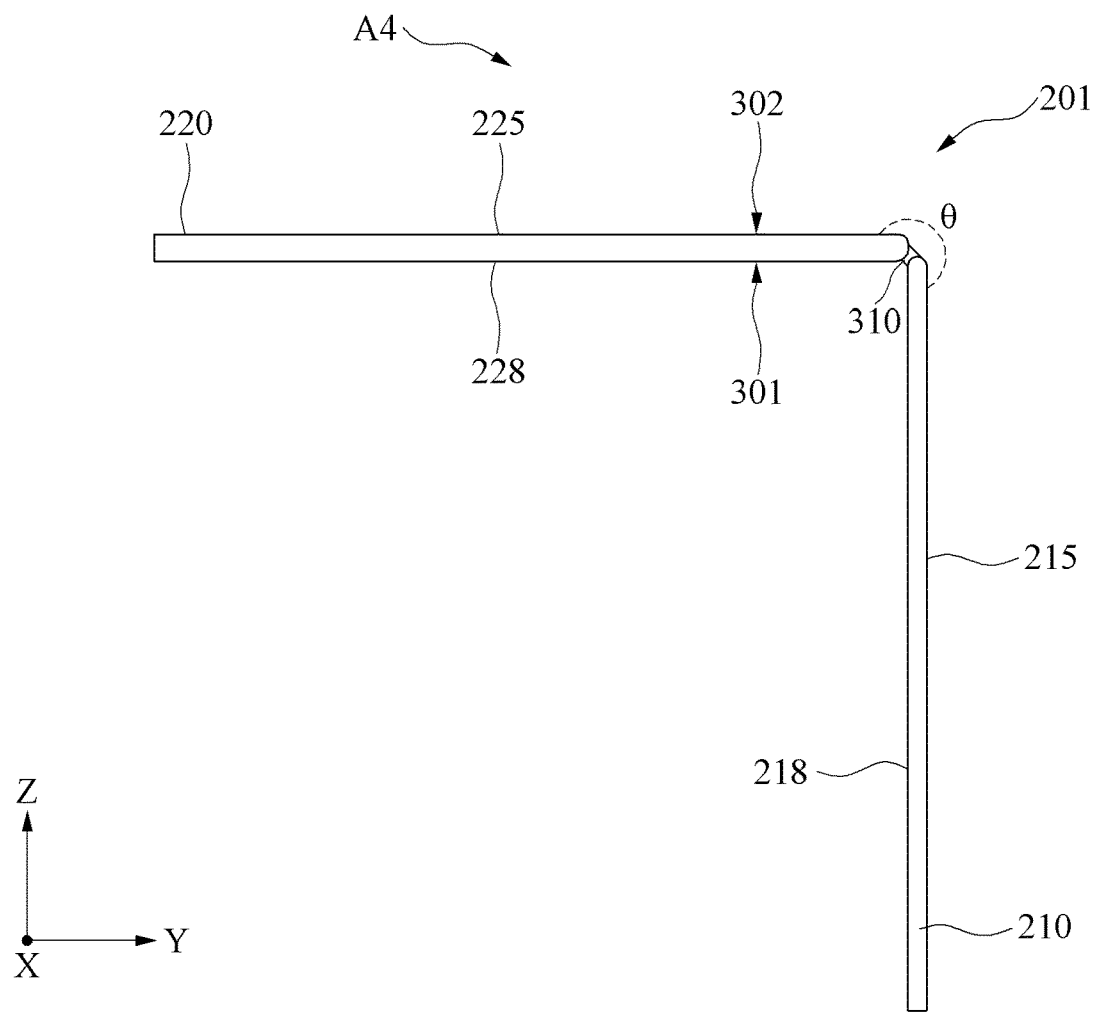
FIG. 4D illustrates a state of an electronic device according to an embodiment.

In an embodiment, referring to FIG. 4D, the fourth state A4 of the electronic device 201 may be a state in which the second surface 218 of the first housing 210 and the third surface 228 of the second housing 220 are close to each other (or closest to each other with a minimal internal angle therebetween). In an embodiment, the fourth state A4 of the electronic device 201 may be a state in which the rotation angle θ is between the intermediate angle (e.g., 180 degrees) and a set angle (e.g., 270 degrees) or may be a state in which the second surface 218 of the first housing 210 and the third surface 228 of the second housing 220 are substantially vertical or adjacent thereto. For example, the fourth state A4 may be an intermediate stage in which the electronic device 201 changes from the clamshell mode to the tablet mode.

The fourth state A4 may be a stage in which both the first door 301 and the second door 302 are closed as the rotation angle θ changes from a previous state (e.g., the third state A3 or a fifth state A5). Although FIG. 4D illustrates that the first door 301 and the second door 302 are both in a closed state, an embodiment is not limited thereto and at least one of the first door 301 and the second door 302 may be open or the doors 301 and 302 may be both open.

Figure 4E:
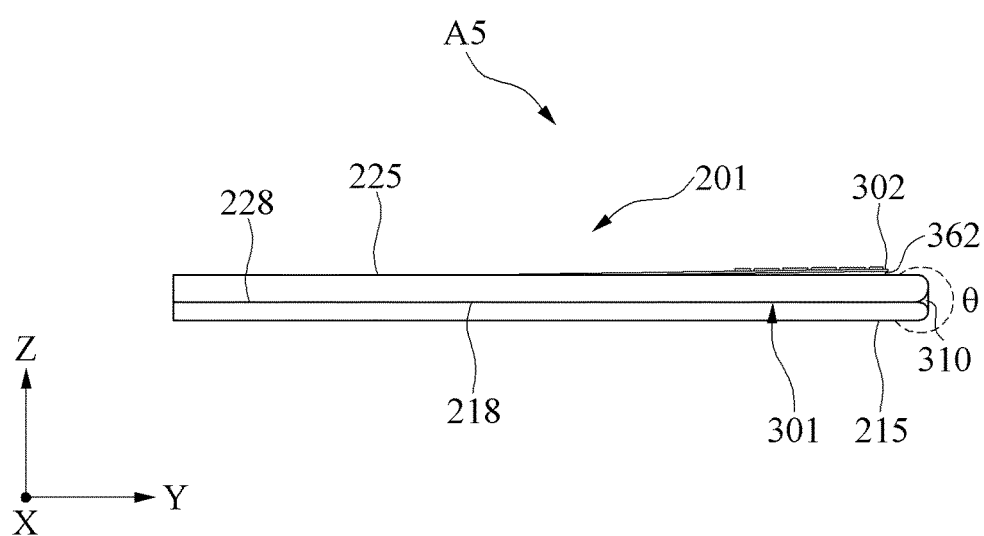
FIG. 4E illustrates a state of an electronic device according to an embodiment.

In an embodiment, referring to FIG. 4E, the fifth state A5 of the electronic device 201 may be a state in which the rotation angle θ is within the end angle (e.g., 360 degrees) or may be a state in which the first surface 215 of the first housing 210 and the fourth surface 225 of the second housing 220 are substantially parallel or adjacent thereto (e.g., completely outfolded). For example, the fifth state A5 of the electronic device 201 may be a state in the tablet mode. In an embodiment, the fifth state A5 may be a state in which the electronic device 201 is on an external support (not illustrated) or may be, for example, a state in which the fourth surface 225 of the electronic device 201 is supported on the top surface of the external support (not illustrated), such as a desk or a table.

In an embodiment, in the electronic device 201 that is in the fifth state A5, the second door 302 may be open. The second door 302 may be open and spaced apart from the fourth surface 225 of the second housing 220, and via the second door 302, external air may be introduced into the second housing 220 or internal air may discharge to the outside. For example, the second door 302 may be open in the tablet mode to form a cooling path of a component of the electronic device 201, which is inside the second housing 220. That is, the second door 302 which is open may expose the inside of the second housing 220 to outside the electronic device 201.

For example, the electronic device 201 needs to form a separate fluid path (not illustrated) or a cooling means for discharging heat in a direction of the fourth surface 225 in the tablet mode, and the width of the second housing 220 may increase. For example, since the tablet mode is in a state in which rear surfaces of the first housing 210 and the second housing 220 substantially contact each other, the electronic device 201 may overheat compared to other states. The electronic device 201 according to various embodiments of the disclosure may control the second door 302 to effectively dissipate heat from a front of the electronic device 201 in various rotation ranges of the first housing 210 and the second housing 220. In addition, the electronic device 201 may be designed to be slim to secure portability.

For example, the second door 302 may supplement a structure in which the first door 301 is closed in the tablet mode of the electronic device 201. In the tablet mode, the display module 211 and the input device 221 may be in opposite directions and the user may mainly use the electronic device 201 in a direction facing the display module 211. In this case, the first door 301 on the third surface 228 of the second housing 220 may be closed by the first housing 210, and accordingly, the second door 302 may be open and discharge heat from an internal component of the second housing 220 to the outside. In various embodiments, the fifth state A5 may limit power supply such that the driving of the input device 221 of the electronic device 201 is limited or may restrict an input recognition of the input device 221 in a process manner.

Figure 5A:
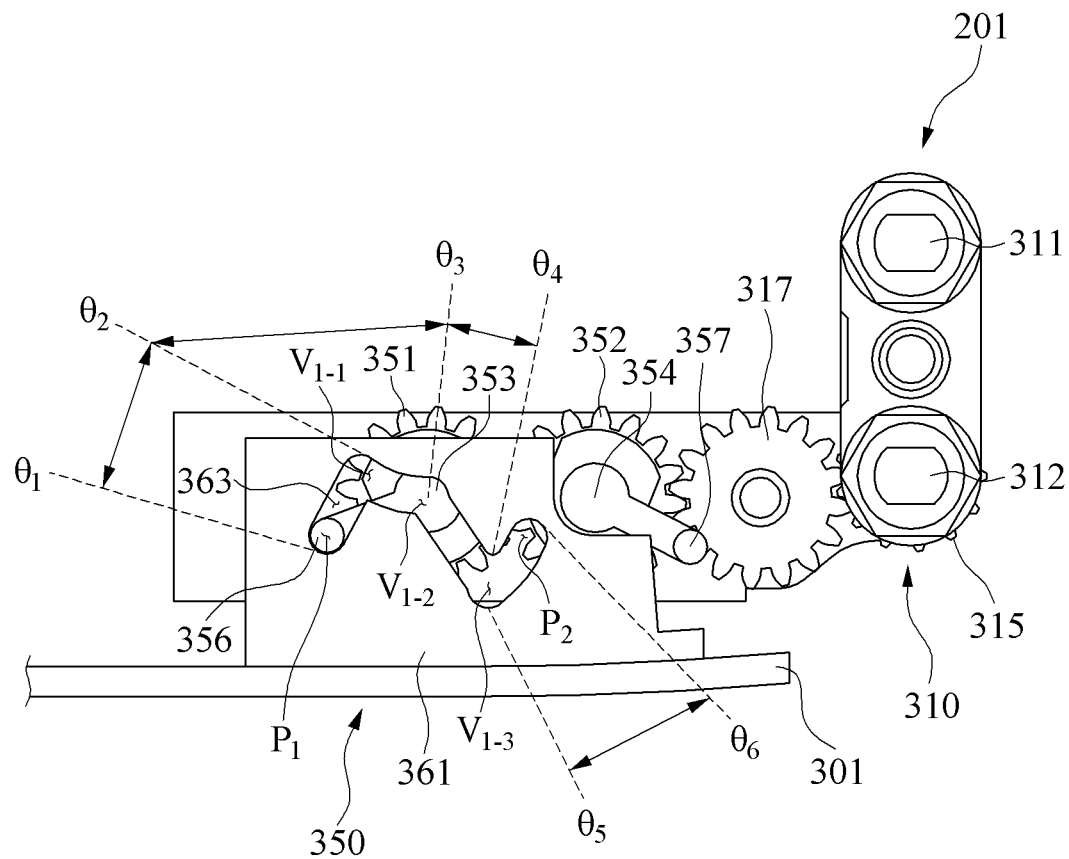
FIG. 5A is a side view illustrating a hinge unit and a first door according to an embodiment.
Figure 5B:
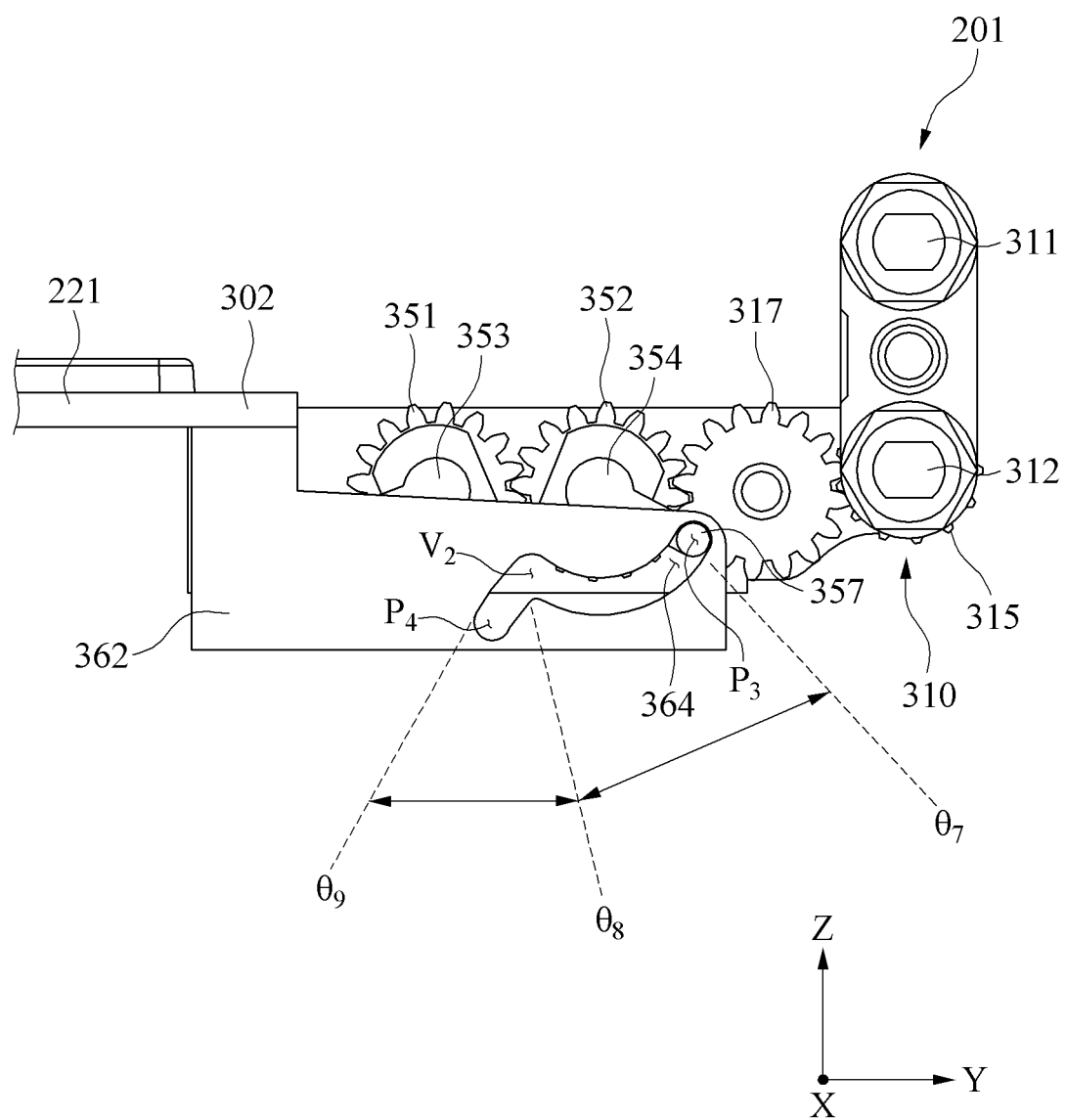
FIG. 5B is a side view illustrating a hinge unit and a second door according to an embodiment.

In various embodiments, the driving module 350 may open and close the first door 301 and the second door 302 by pressing a first support member (e.g., the first support member 361 of FIG. 5A) and a second support member (e.g., the second support member 362 of FIG. 5B). For example, when the rotation angle θ is less than a set first angle (e.g., a first reference angle), the driving module 350 may press the first support member 361 to open the first door 301, and when the rotation angle θ is greater than a set second angle (e.g., a second reference angle), the driving module 350 may press the second support member 362 to open the second door 302. A structure and an operation of the first support member 361 and the second support member 362 are described with reference to FIG. 5A and thereafter.

In an embodiment, in a state (e.g., the second state A2 or the third state A3) in which the rotation angle is less than the first angle (e.g., 270 degrees), the driving module 350 may open the first door 301. For example, the first angle may be an angle at which the electronic device 201 is in the clamshell mode or may be an angle of a state in which the tablet mode is excluded from the unfolded state (e.g., except for the unfolded state). For example, the first angle may be a predetermined angle set to a range less than 180 degrees or 270 degrees.

In an embodiment, in a state (e.g., the fifth state A5) in which the rotation angle is greater than the second angle (e.g., 270 degrees), the driving module 350 may open the second door 302. For example, the second angle may be an angle at which the electronic device 201 is in the tablet mode or may be an angle of a state in which the clamshell mode is excluded from the unfolded state. For example, the second angle may be a predetermined angle set to a range less than 270 degrees.

In various embodiments, the driving module 350 may selectively open the plurality of doors 301 and 302, based on the rotation angle θ of the electronic device 201, and may form a fluid path for dissipating heat from the electronic device 201 considering the usage environment of the electronic device 201.

For example, a plurality of components controlling the driving of the electronic device 201 may be inside the second housing 220, and as the electronic device 201 is driven, the inside of the second housing 220 may overheat. When the internal temperature of a housing increases, the internal components of the electronic device 201 may be damaged or performance of the electronic device 201 deteriorates, which may inconvenience the user and accordingly, cooling means may be required.

In various embodiments, the second housing 220 may include a heat dissipating module (not illustrated), such as a heat plate (not illustrated), a heat pipe (not illustrated), or a vacuum chamber (not illustrated). The heat dissipating module (not illustrated) may disperse heat from a component generating a large amount of heat among the internal components of the electronic device 201. The heat dissipating module (not illustrated) according to various embodiments may require a predetermined amount of installation area inside the second housing 220 to discharge heat from a predetermined component.

In various embodiments, the second housing 220 may include a fan (not illustrated) and a cooling path (not illustrated). The cooling path (not illustrated) may communicate from the inside of the electronic device 201 to the outside to discharge hot air from the inside of the electronic device 201 to the outside and to introduce cool air from the outside into the inside of the electronic device 201. The cooling path (not illustrated) may be provided as an empty space inside the second housing 220.

Although the heat dissipating module (not illustrated) and the cooling path (not illustrated) may be installed in the electronic device 201 according to various embodiments, spaces for them need to be provided and the size of the electronic device 201 increases, which may cause low portability.

In the electronic device 201 according to an embodiment, the first door 301 or the second door 302 may be open in some states (e.g., the second state A2, the third state A3, or the fifth state A5) in which the electronic device 201 is actively driven, the inside of the second housing 220 may be in fluid communication with the outside of the second housing 220 via the plurality of doors 301 and 302, and heat may dissipate from the internal components. The plurality of doors 301 and 302 may interoperate with the driving of the hinge unit 310 to be opened and closed automatically, and the first door 301 and the second door 302 may be open and closed considering the driving state of the electronic device 201.

The electronic device 201 according to various embodiments of the disclosure may reduce an additional component for heat dissipation, the portability may improve through an implementation of the electronic device 201 to be slim, a heat dissipation performance of the electronic device 201 may improve, and the internal components may be effectively cooled.

Referring to FIG. 4D, the first angle may be substantially the same as the second angle (e.g., 270 degrees) and the driving module 350 may close the first door 301 and the second door 302 when the rotation angle θ is the first angle (or the second angle). For example, the fourth state A4 may be a state in which the electronic device 201 is used in the clamshell mode and the tablet mode at the same time. The fourth state A4 may be a state in which the plurality of doors 301 and 302 is closed and the heat dissipation performance deteriorates, and a system of the electronic device 201 may inform the user of the state.

In an embodiment, the first angle may be less than the second angle. The driving module 350 may close the second door 302 when the rotation angle θ is less than the first angle and may close the first door 301 when the rotation angle θ is greater than the second angle. For example, in a state less than the first angle, the first door 301 may be opened and the second door 302 may be closed and in a state greater than the second angle, the first door 301 may be closed and the second door 302 may be opened.

In an embodiment, although not illustrated, the driving module 350 may open both of the first door 301 and the second door 302 at an angle between the first angle and the second angle. A state in which the first door 301 and the second door 302 are both opened may be, for example, a state in which the first door 301 and the second door 302 are both opened in the fourth state A4 of FIG. 4D. For example, the electronic device 201 may open both of the doors 301 and 302 in the intermediate stage between the clamshell mode and the tablet mode to maximize the heat dissipation performance. In another embodiment, as illustrated in FIG. 4D, the driving module 350 may close both of the first door 301 and the second door 302 at an angle between the first angle and the second angle. In this case, the electronic device 201 may be in the intermediate state between the clamshell mode and the tablet mode.

In an embodiment, as illustrated in FIGS. 4A through 4E, the hinge unit 310 may rotate the first housing 210 and the second housing 220 in a range from the start angle (e.g., 0 degrees) at which the second surface 218 and the first door 301 face each other to the end angle (e.g., 360 degrees) at which the first surface 215 and the second door 302 face each other. For example, the electronic device 201 of which a housing is rotatable by 360 degrees may be a convertible PC.

For example, the first state A1 may be a state of the start angle and the driving module 350 may be in the folded state in which the first door 301 and the second door 302 both are closed. For example, the fifth state A5 may be a state of the end angle and the driving module 350 may be in a driving state in the tablet mode in which the first door 301 is closed and the second door 302 is open.

In another embodiment, the end angle of the electronic device 201 may be an angle between 90 degrees and 270 degrees and may be 180 degrees. In this case, the electronic device 201 may be used in the clamshell mode and the first door 301 and the second door 302 may be alternately opened and closed to dissipate heat from the electronic device 201.

The driving module 350 according to an embodiment may open and close the first door 301 and the second door 302 such that the first door 301 and the second door 302 are alternately opened as the rotation angle θ increases or decreases. For example, as the rotation angle θ increases, the driving module 350 may open the first door 301 in some regions (e.g., a region between the first state A1 and the fourth state A4) and may open the second door 302 in the other regions (e.g., a region between the fourth state A4 and the fifth state A5). In various embodiments, when the first angle and the second angle are substantially the same or similar, the second door 302 may be opened after the first door 301 is closed, or the first door 301 may be opened after the second door 302 is closed. For example, the first door 301 and the second door 302 of the electronic device 201 may be alternately opened.

FIG. 5A is a side view illustrating the hinge unit 310 and the first door 301 according to an embodiment, and FIG. 5B is a side view illustrating the hinge unit 310 and the second door 302 according to an embodiment. For convenience of illustration, the view of FIG. 5A omits the second support member 362 which is in front of the first support member 361 in the +Z direction, and the view of FIG. 5B omits the first support member 361 which is behind the second support member 362 in the −Z direction.

Referring to FIGS. 5A and 5B, the electronic device 201 according to various embodiments may include the first support member 361, the second support member 362, a first slot 363, and a second slot 364.

When describing the electronic device 201 with reference to FIG. 5A and thereafter, repeated descriptions already provided above of the electronic device 201, the hinge unit 310, and the driving module 350 are omitted, and an opening and closing structure of the first door 301 and the second door 302 is described.

In an embodiment, the support members 361 and 362 may be respectively connected to the first door 301 and the second door 302 and may include the slots 363 and 364 that respectively are paths along which a shaft arm moves by interoperating with a rotation of a respective shaft. For example, the first support member 361 may include the first slot 363 in which (or along which) the first shaft arm 356 moves and the second support member 362 may include the second slot 364 in which (or along which) the second shaft arm 357 moves. That is, a shaft arm may be movable along a respective slot.

In an embodiment, in the driving module 350, the shaft arms 356 and 357 may press or be engaged with the slots 363 and 364 by interoperating with the rotation of the shafts 353 and 354 to push the support members 361 and 362 (e.g., apply a force to a respective support member). However, the driving module 350 is not limited thereto, and the driving module 350 according to various embodiments may open and close the first door 301 and the second door 302 based on a position of a shaft arm within a slot.

In an embodiment, the electronic device 201 may be used by being supported by an external support (not illustrated). The third surface 228 of the second housing 220 may contact the external support (not illustrated), and the first door 301 may be supported in a direction facing the external support (not illustrated). The driving module 350 may open the first door 301 by pushing the first door 301 in an outer direction (e.g., −Z direction) of the second housing 220. In an embodiment, the pushing of the first door 301 in an outer direction (e.g., −Z direction) may provide a force in a +Z direction to essentially lift portions of the electronic device 201 and separate a portion of the third surface 228 from the external support to provide an open heat flow path. In an embodiment, in the electronic device 201, air may enter into and exit from a clearance between the first door 301 and the second housing 220 formed when the first door 301 is open and the electronic device 201 may discharge the heat from the internal components.

In an embodiment, the second housing 220 may include the input device 221 provided on the fourth surface 225 and the second door 302 may be connected to the input device 221. In the tablet mode, the input device 221 may be in a direction opposite to the display module 211 and the driving of the input device 221 may be stopped or limited. The driving module 350 may open and close the second door 302 by pushing the second door 302 and the input device 221 together with the second door 302, from the second housing 220.

Hereinafter, a structure is described in detail in which the shaft arms 356 and 357 of the driving module 350 push against the support members 361 and 362 at the respective slots, and the support members 361 and 362 respectively support the first door 301 and the second door 302 such that the driving module 350 opens and closes the first door 301 and the second door 302 based on the rotation of the shafts 353 and 354. Where the support members 361 and 362 respectively support the first door 301 and the second door 302, a respective door may be movable together with movement of a respective support member. However, the structure is not limited thereto in the implementation, and the driving module 350 may open and close the first door 301 and the second door 302 in various manners.

In an embodiment, the driving module 350 may include the first gear 351 and the first shaft arm 356 which is connected to the first gear 351 via the first shaft 353, where the first gear 351 rotates in one direction by interoperating with the hinge unit 310. The driving module 350 may include the second gear 352 and the second shaft arm 357 which is connected to the second gear 352 via the second shaft 354, where the second gear 352 rotates in a direction opposite to the first gear 351 by interoperating with the hinge unit 310. In various embodiments, the first shaft arm 356 and the second shaft arm 357 of the driving module 350 may move by interoperating with the hinge unit 310 and may open and close the first door 301 and the second door 302 by pushing the first support member 361 and the second support member 362 respectively connected to the first door 301 and the second door 302.

In an embodiment, the first shaft arm 356 may move in the first slot 363 according to the rotation of the first gear 351 and press the first support member 361 at a predetermined position. The first support member 361 may be fixed at the first door 301 and may move in a direction (e.g., +/−Z direction) by movement of the first shaft arm 356 along the first slot 363. The first support member 361 may open the first door 301 by pushing the first door 301 in a down direction (e.g., −Z direction) from the second housing 220. That is, the first door 301 is movable relative to the second housing 220, to be protruded therefrom and disposed outside of the second housing 220.

Rotation of (or angle between) the first housing 210 relative to the second housing 220 may correspond to various positions along the first slot 363. In an embodiment, the first housing 210 and the second housing 220 may rotate from a first position $\theta_1$ corresponding to the start angle to a sixth position $\theta_6$ corresponding to the end angle. That is, the first housing 210 and the second housing 220 may rotate from the start angle corresponding to a first position $\theta_1$ along the first slot 363, to the end angle corresponding a sixth position $\theta_6$ along the first slot 363. The first slot 363 may include a first start region $P_1$ in which the first shaft arm 356 is at the first position $\theta_1$ to a first end region $P_2$ in which the first shaft arm 356 is at the sixth position $\theta_6$. In an embodiment, the fourth position $\theta_4$ may be substantially the same position as or a mutually adjacent position to the fifth position $\theta_5$ may be substantially the same position or mutually adjacent positions.

In an embodiment, the first slot 363 may define different movement directions of the first shaft arm 356 among paths in which the first shaft arm 356 moves from the first start region $P_1$ to the first end region $P_2$ and may include inflection regions $V_{1-1}$, $V_{1-2}$, and $V_{1-3}$ in which the rotation angle $\theta$ of the electronic device 201 corresponds to a second position $\theta_2$, a third position $\theta_3$, and a fourth position $\theta_4$, respectively. At a respective inflection region, a direction of the first slot 363 changes to a different direction. A structure in which the first door 301 is opened and closed while the first shaft arm 356 moves in the first slot 363 is described in detail with reference to FIGS. 6A through 6E.

In an embodiment, the second shaft arm 357 may move in the second slot 364 according to the rotation of the second gear 352 and press the second support member 362 at a predetermined position. The second support member 362 may be fixed at the second door 302 and may move in a direction (e.g., +/−Z direction) being pressed. The second support member 362 may open the second door 302 by pushing the second door 302 in an up direction (e.g., +Z direction) from the second housing 220.

In an embodiment, the first housing 210 and the second housing 220 may rotate from a seventh position $\theta_7$ at which the rotation angle $\theta$ is the start angle to a ninth position $\theta_9$ at which the rotation angle $\theta$ is the end angle. That is, the first housing 210 and the second housing 220 may rotate from the start angle corresponding to a seventh position $\theta_7$ along the second slot 364, to the end angle corresponding a ninth position $\theta_9$ along the second slot 364. The second slot 364 may include a second start region $P_3$ in which the second shaft arm 357 is at the seventh position $\theta_7$ to a second end region $P_4$ in which the second shaft arm 357 is at the ninth position $\theta_9$ and may include a second inflection region $V_2$ that changes a movement direction of the second shaft arm 357 among paths in which the second shaft arm 357 moves from the second start region $P_3$ to the second end region $P_4$. A structure in which the second door 302 is opened and closed while the second shaft arm 357 moves in the second slot 364 is described in detail with reference to FIGS. 7A through 7C.

In various embodiments, FIGS. 5A and 5B illustrate an embodiment for describing an opening and closing structure of the electronic device 201 according to various embodiments of the disclosure. Via a structure design of the first slot 363 and the second slot 364, an angle between the first housing 210 and the second housing 220 for the driving module 350 to open and close the first door 301 and the second 302 may be variously combined.

FIGS. 6A through 6E illustrate various states of the electronic device 201 according to an embodiment. For convenience of illustration, the views of FIGS. 6A through 6E omit the second support member 362 which is in front of the first support member 361 in the +Z direction.

Referring to FIGS. 6A through 6E, the electronic device 201 according to various embodiments may transform into a plurality of states S1, S2, S3, S4, and S5, based on a rotation angle $\theta$ between the first housing 210 and the second housing 220, and the first door 301 may be opened and closed based on the plurality of states S1, S2, S3, S4, and S5 of the electronic device 201. In various embodiments, each of the plurality of states S1, S2, S3, S4, and S5 of the electronic device 201 of FIGS. 6A through 6E may be a state corresponding to each of the plurality of states A1, A2, A3, A4, and A5 of the electronic device 201 of FIGS. 4A through 4E, but is not limited thereto, and each of the plurality of states S1, S2, S3, S4, and S5 may differ from each of the plurality of states A1, A2, A3, A4, and A5.

In various embodiments, the first state S1 may be a folded state of the electronic device 201 and may be a state in which the display module 211 and the input device 221 of the electronic device 201 are not visible. For example, the first state S1 through the third state S3 may be states in which the electronic device 201 is used in the clamshell mode and the fourth state S4 and the fifth state S5 may be states in which the electronic device 201 is used in the tablet mode.

Referring to FIG. 5A when describing the plurality of states S1, S2, S3, S4, and S5, the first state S1 may be a state in which the rotation angle $\theta$ is at the first position $\theta_1$, the second state S2 may be a state in which the rotation angle $\theta$ is at the second position $\theta_2$, the third state S3 may be a state in which the rotation angle $\theta$ is at the third position $\theta_3$, the fourth state S4 may be a state in which the rotation angle $\theta$ is at the fourth position $\theta_4$ or the fifth position $\theta_5$, and the fifth state S5 may be a state in which the rotation angle $\theta$ is at the sixth position $\theta_6$.

Figure 6A:
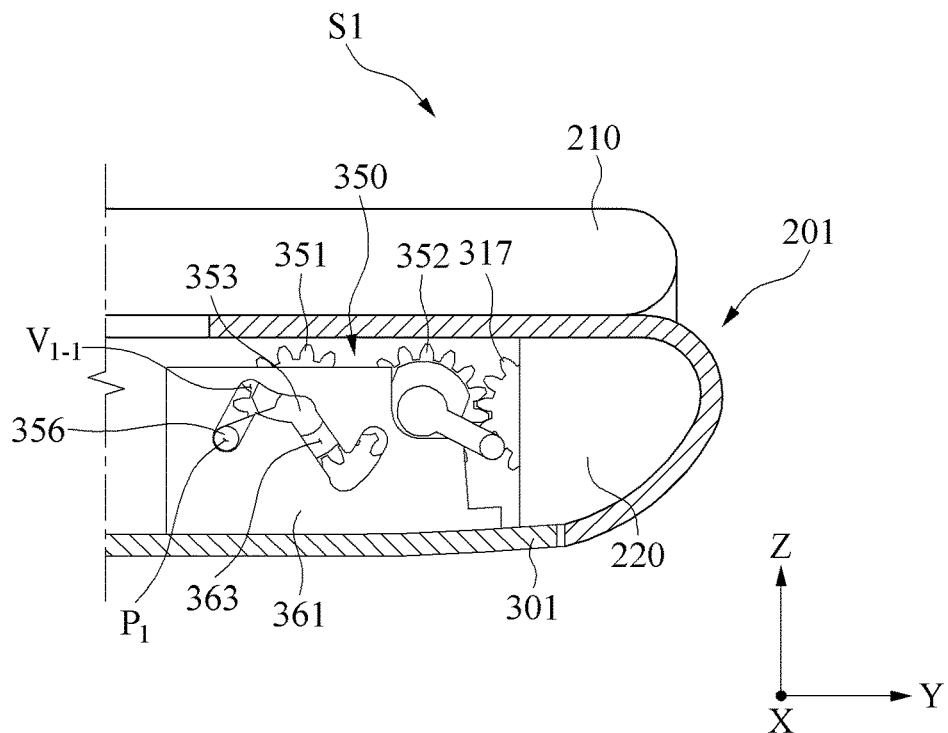
FIG. 6A illustrates a state of an electronic device according to an embodiment.
Figure 6B:
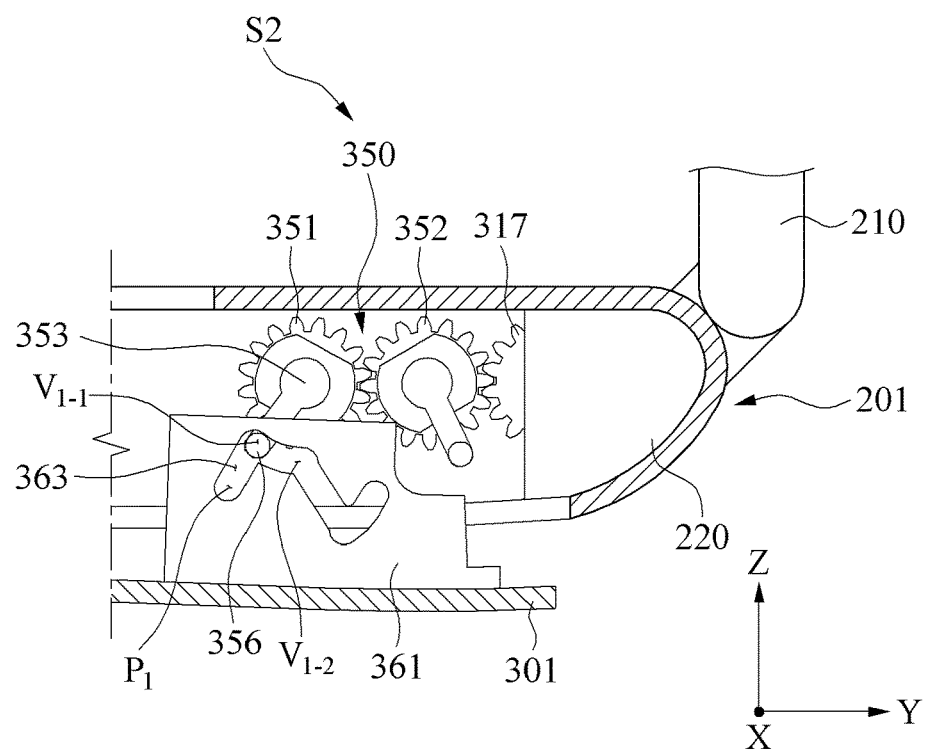
FIG. 6B illustrates a state of an electronic device according to an embodiment.

In an embodiment, referring to FIGS. 6A and 6B, the electronic device 201 which defines the rotation angle $\theta$ between the first position $\theta_1$ and the second position $\theta_2$ may open and close the first door 301. The first shaft arm 356 may move between the first start region $P_1$ and a 1-1 inflection region $V_{1-1}$ and for example, the first shaft arm 356 may open the first door 301 by interoperating with the first slot 363, while moving from the first start region $P_1$ and the 1-1 inflection region $V_{1-1}$. As shown in FIG. 6A, the electronic device 201 which defines the rotation angle θ at substantially the first position $θ_1$ may dispose the first door 301 coplanar with an outer surface of the second housing 220 (e.g., the third surface 228). Taking FIGS. 6A and 6B together, the electronic device 201 which defines the rotation angle θ between the first position $θ_1$ and the second position $θ_2$ may dispose the first door 301 protruding out of the second housing 220 to extend further than the outer surface of the second housing 220. That is, the first door 310 is movable together with the first shaft arm 356 along the first slot 363.

Figure 6C:
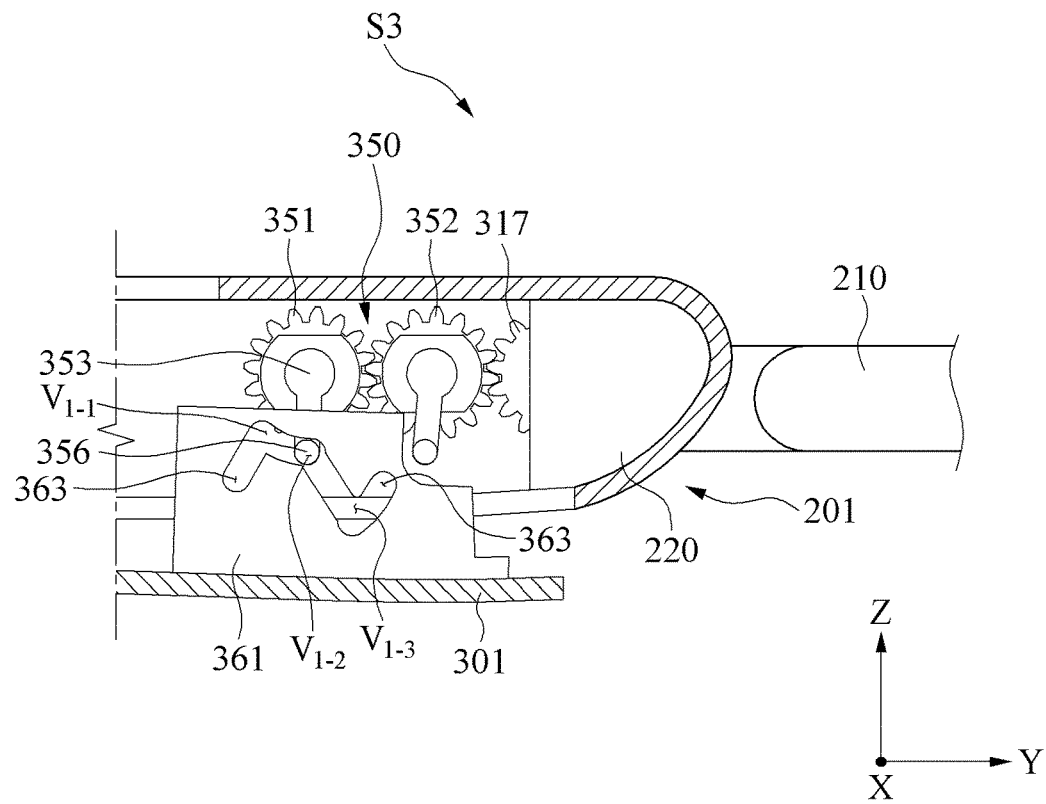
FIG. 6C illustrates a state of an electronic device according to an embodiment.

In an embodiment, referring to FIGS. 6B and 6C, the electronic device 201 may maintain an unfolded state of the first door 301 between the second position $θ_2$ and the third position $θ_3$. The first shaft arm 356 may move between the 1-1 inflection region $V_{1-1}$ and a 1-2 inflection region $V_{1-2}$ and support the first door 301 in the open state. A path of the first slot 363 from the 1-1 inflection region $V_{1-1}$ to the 1-2 inflection region $V_{1-2}$ may be substantially the same as a rotation path of the first shaft 353. Since the path of the first slot 363 from the 1-1 inflection region V1-1 to the 1-2 inflection region V1-2 may be substantially the same as a rotation path of the first shaft 353, the electronic device 201 which defines the rotation angle θ between the second position θ2 and the third position θ3 may dispose the first door 301 protruded at a same distance from the outer surface of the second housing 220, without being limited thereto.

Figure 6D:
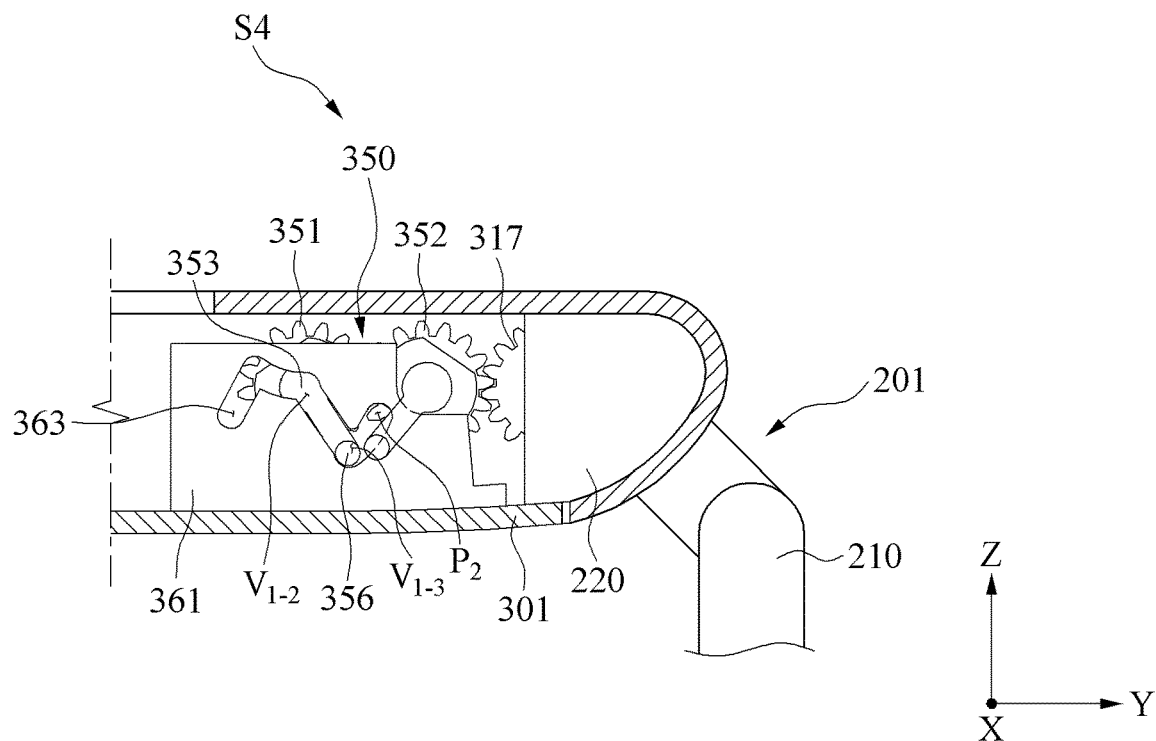
FIG. 6D illustrates a state of an electronic device according to an embodiment.

In an embodiment, referring to FIGS. 6C and 6D, the electronic device 201 may open and close the first door 301 between the third position $θ_3$ and the fourth position $θ_4$. The first shaft arm 356 may move between the 1-2 inflection region $V_{1-2}$ and a 1-3 inflection region $V_{1-3}$ and for example, the first shaft arm 356 may close the first door 301 by interoperating with the first slot 363, while moving from the 1-2 inflection region $V_{1-2}$ to the 1-3 inflection region $V_{1-3}$, or may open the first door 301 by interoperating with the first slot 363, while moving from the 1-3 inflection region $V_{1-3}$ to the 1-2 inflection region $V_{1-2}$.

Figure 6E:
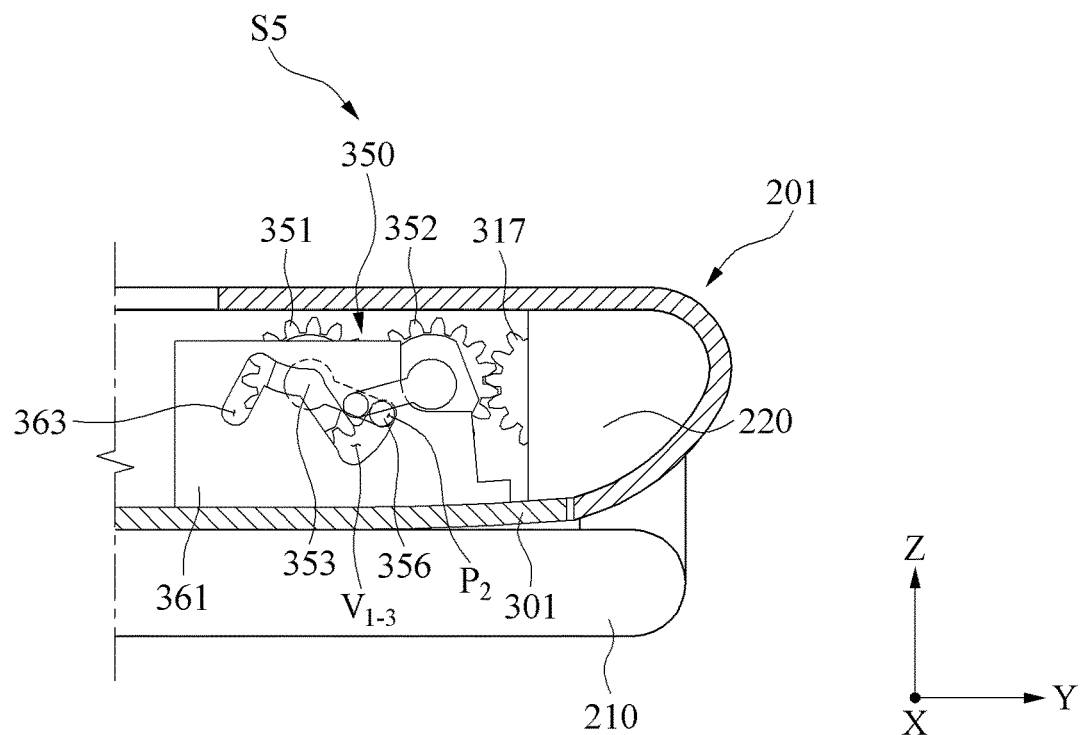
FIG. 6E illustrates a state of an electronic device according to an embodiment.

In an embodiment, referring to FIGS. 6D and 6E, the electronic device 201 may maintain the folded state of the first door 301 (e.g., closed state) between the fifth position $θ_5$ and the sixth position $θ_6$. In an embodiment, the fourth position $θ_4$ and the fifth position $θ_5$ may be mutually adjacent positions, or substantially the same position. The first shaft arm 356 may move between the 1-3 inflection region $V_{1-3}$ and the first end region $P_2$ and support the first door 301. A path of the first slot 363 from the 1-3 inflection region $V_{1-3}$ to the first end region $P_2$ may be the same as the rotation path of the first shaft 353.

In an embodiment, the fourth state S4 of the electronic device 201 may be a state in which the rotation angle θ of the electronic device 201 is adjacent to the set first angle. From the fourth state S4 to the third state S3, the rotation angle θ of the electronic device 201 may decrease and the driving module 350 may open the first door 301.

Figure 7A:
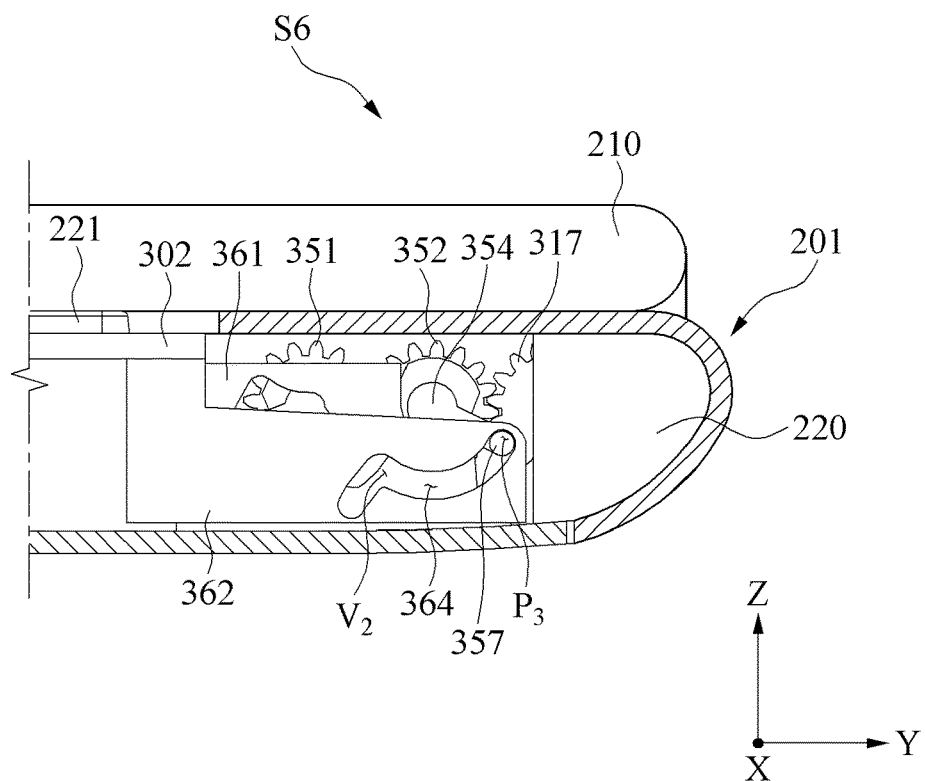
FIG. 7A illustrates a state of an electronic device according to an embodiment.
Figure 7B:
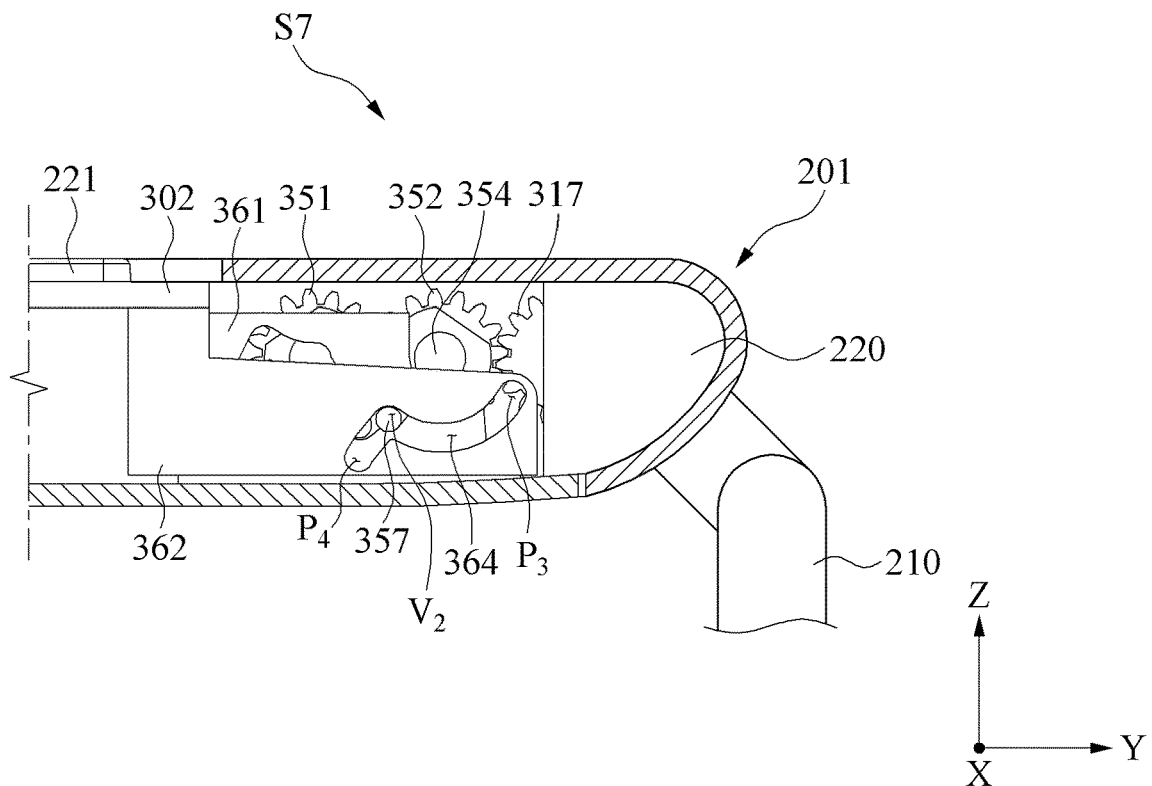
FIG. 7B illustrates a state of an electronic device according to an embodiment.
Figure 7C:
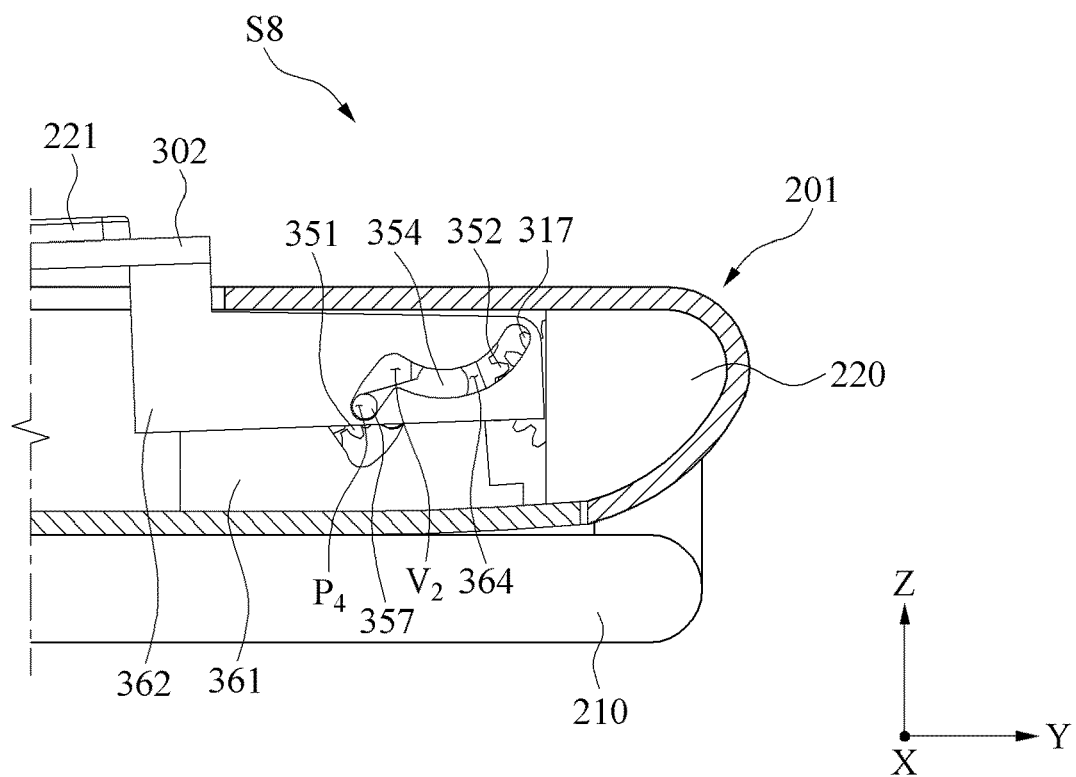
FIG. 7C illustrates a state of an electronic device according to an embodiment.

FIGS. 7A through 7C illustrate various states of the electronic device 201 according to an embodiment. The views in FIGS. 7A through 7C show portions of the first support member 361 which is behind the second support member 362 in the −Z direction.

Referring to FIGS. 7A through 7C, the electronic device 201 according to various embodiments may transform into a plurality of states S6, S7, and S8, based on a rotation angle θ between the first housing 210 and the second housing 220, and the second door 302 may be opened and closed based on the plurality of states S6, S7, and S8 of the electronic device 201. In various embodiments, each of the plurality of states S6, S7, and S8 of the electronic device 201 of FIGS. 7A through 7C may be a state corresponding to each of the plurality of states A1, A4 and A5 of the electronic device 201 of FIGS. 4A, 4D and 4E, or corresponding to each of the plurality of states S1, S4 and S5 of the electronic device 201 of FIGS. 6A, 6D and 6E, but is not limited thereto. In an embodiment, each of the plurality of states S6, S7, and S8 may differ from each of the plurality of states A1, A4 and A5, or each of the plurality of states S1, S4 and S5.

In various embodiments, the sixth state S6 may be the folded state of the electronic device 201 and may be the state in which the display module 211 and the input device 221 of the electronic device 201 are not visible. The input device 221 may be coplanar with the second housing 220, without being limited thereto. For example, at least some sections between the seventh state S7 and the eighth state S8 may be states in which the electronic device 201 is used in the clamshell mode and the eighth state S8 may be a state in which the electronic device 201 is used in the tablet mode.

Referring to FIG. 5B when describing the plurality of states S7, S8 and S9, the sixth state S6 may be a state in which the rotation angle θ is at the seventh position $θ_7$, the seventh state S7 may be a state in which the rotation angle θ is at the eighth position $θ_8$, and the eighth state S8 may be a state in which the rotation angle θ is at the ninth position $θ_9$.

In an embodiment, referring to FIGS. 7A and 7B, the electronic device 201 may maintain a folded state of the second door 302 (e.g., closed state) when the rotation angle θ is between the seventh position $θ_7$ and the eighth position $θ_8$. The second shaft arm 357 may move between the second start region $P_3$ and the second inflection region $V_2$ and support the second door 302. A path of the second slot 364 from the second start region $P_3$ to the second inflection region $V_2$ may be the same as a rotation path of the second shaft 354.

In an embodiment, referring to FIGS. 7B and 7C, the electronic device 201 may open and close the second door 302 when the rotation angle θ is between the eighth position $θ_8$ and the ninth position $θ_9$. The second shaft arm 357 may move between the second inflection region $V_2$ and the second end region $P_4$ and for example, the second shaft arm 357 may open the second door 302 by interoperating with the second slot 364, while moving from the second inflection region $V_2$ to the second end region $P_4$. Alternatively, the second shaft arm 357 may close the second door 302 by interoperating with the second slot 364, while moving from the second end region $P_4$ to the second inflection region $V_2$.

In an embodiment, the seventh state S7 of the electronic device 201 may be a state in which the rotation angle θ of the electronic device 201 is adjacent to the set second angle. From the seventh state S7 to the eighth state S8, the rotation angle θ of the electronic device 201 may increase and the driving module 350 may open the second door 302. Opening of the second door 302 may protrude the input device 221 from the second housing 220, as shown in FIG. 7C.

Referring to FIGS. 6A through 7C, the electronic device 201 may alternately open and close the first door 301 and the second door 302 as the rotation angle θ increases or decreases.

For example, when the rotation angle θ is between the start angle (e.g., an angle of the first position $θ_1$ of FIG. 6A or an angle of the seventh position $θ_7$ of FIG. 7A) and the first angle (e.g., an angle of the fourth position $θ_4$ of FIG. 6D or an angle of the eighth angle $θ_8$ of FIG. 7B), at least some regions of the first door 301 may be opened and the second door 302 may be closed.

For example, when the rotation angle θ is between the second angle (e.g., an angle of the seventh position $θ_7$ of FIG. 7B or an angle of the fourth position $θ_4$ of FIG. 6D) and the end angle (e.g., an angle of the eighth position $θ_8$ of FIG. 7C or an angle of the fifth position $θ_5$ of FIG. 6E), the first door 301 may be closed and at least some regions of the second door 302 may be opened.

The electronic device 201 according to various embodiments may include the first housing 210 that includes the display module 211 providing a display screen, the second housing 220 that includes the first door 301 provided on one surface 228 and the second door 302 provided on another surface 225 opposite to the first door 301, the hinge unit 310 that rotatably connects the first housing 210 to the second housing 220, and the driving module 350 that opens and closes the first door 301 and the second door 302 by interoperating with the hinge unit 310. The driving module 350 may open the first door 301 when the rotation angle θ (e.g., an angle formed between the first housing 210 and the second housing 220 based on the hinge unit 310) is less than the set first angle (e.g., first reference angle) and may open the second door 302 when the rotation angle θ is greater than the set second angle (e.g., second reference angle).

In an embodiment, the first angle may be substantially the same as the second angle and the driving module 350 may close the first door 301 and the second door 302 when the rotation angle θ is the first angle.

In an embodiment, the first angle may be less than the second angle and the driving module 350 may close the second door 302 when the rotation angle θ is less than the first angle and may close the first door 301 when the rotation angle θ is greater than the second angle.

In an embodiment, the driving module 350 may open the first door 301 and the second door 302 when the rotation angle θ is between the first angle and the second angle.

In an embodiment, the driving module 350 may open and close the first door 301 and the second door 302 such that the first door 301 and the second door 302 are alternately opened as the rotation angle θ increases.

In an embodiment, the hinge unit 310 may rotate the first housing 210 and the second housing 220 such that an angle at which the first housing 210 and the first door 301 face each other (e.g., completely infolded) is the start angle and an angle at which the first housing 210 and the second door 302 face each other (e.g., completely outfolded) is the end angle.

In an embodiment, the driving module 350 may close the first door 301 and the second door 302 at the start angle and may close the first door 301 and open the second door 302 at the end angle.

In an embodiment, the second housing 220 may include the input device 221 connected to the second door 302 and the driving module 350 may open and close the second door 302 by pushing the second door 302 and the input device 221 from the second housing 220.

In an embodiment, the electronic device 201 may be supported in a direction in which the first door 301 and an external support (not illustrated) face each other and the driving module 350 may open the first door 301 by pushing the second housing 220 from the first door 301 in a state in which the first door 301 contacts the external support (not illustrated). The pushing of the second housing 220 by the first door 301 which is open, may dispose the second housing 220 spaced apart from the external support and define a heat dissipation path adjacent to the external support, without being limited thereto.

In an embodiment, the driving module 350 may include the gears 351 and 352 that rotate by interoperating with the hinge unit 310, the shafts 353 and 354 that extend from the rotation axis of the gears 351 and 352 and include the shaft arms 356 and 357, and the slots 363 and 364 in which the shaft arms 356 and 357 move by interoperating with the rotation of the shafts 353 and 354. Also, the driving module 350 may include the support members 361 and 362 connected to the first door 301 and the second door 302, respectively.

In an embodiment, in the driving module 350, the shaft arms 356 and 357 may press the slots 363 and 364, to be moveable along the slots 363 and 364, by interoperating with the rotation of the shafts 353 and 354 to push the support members 361 and 362.

In an embodiment, the driving module 350 may include the first gear 351 that rotates in one direction by interoperating with the hinge unit 310 and the second gear 352 that rotates in a direction opposite to the first gear 351 by engaging with the first gear 351.

In an embodiment, the driving module 350 may include the first shaft arm 356 and the second shaft arm 357 that move by interoperating with the hinge unit 310, the first support member 361 that includes the first slot 363 being a path in which the first shaft arm 356 moves and is pressed by the first shaft arm 356 to push the first door 301 from the second housing 220, and the second support member 362 that includes the second slot 364 being a path in which the second shaft arm 357 moves and is pressed by the second shaft arm 357 to push the second door 302 from the second housing 220.

In an embodiment, the first slot 363 may include the first inflection regions $V_{1-1}$, $V_{1-2}$, and $V_{1-3}$ in which a movement direction of the first shaft arm 356 changes at a position at which the rotation angle θ is adjacent to the first angle.

In an embodiment, the second slot 364 may include the second inflection region $V_2$ in which a movement displacement of the second shaft arm 357 changes at a position at which the rotation angle θ is adjacent to the second angle.

In an embodiment, the electronic device 201 may include the housings 210 and 220 that include the first housing 210 including the first surface 215 and the second surface 218 opposite to the first surface 215, the second housing 220 including the third surface 228 and the fourth surface 225 opposite to the third surface 228, the first door 301 provided on the third surface 228, and the second door 302 provided on the fourth surface 225, the hinge unit 310 configured to connect the first housing 210 to the second housing 220 and adjust a rotation angle θ, which is an angle between the first housing 210 and the second housing 220, from a start angle at which the first surface 215 and the fourth surface 225 face each other to an end angle at which the second surface 218 and the third surface 228 face each other, and the driving module 350 configured to open the first door 301 when the rotation angle θ is less than a set first angle and open the second door 302 when the rotation angle θ is greater than a second angle, the second angle being equal to or greater than the first angle.

In an embodiment, the driving module 350 may close the first door 301 and the second door 302 at the start angle and may close the first door 301 and open the second door 302 at the end angle.

In an embodiment, the driving module 350 may open the first door 301 and close the second door 302 when the rotation angle θ is between the start angle and the first angle and may close the first door 301 and the open the second door 302 when the rotation angle θ is between the second angle and the end angle.

In an embodiment, the first angle may be substantially the same as the second angle and the driving module 350 may close the first door 301 and the second door 302 when the rotation angle θ is the first angle.

In an embodiment, the driving module 350 may open and close the first door 301 and the second door 302 such that the first door 301 and the second door 302 are alternately opened as the rotation angle θ increases.

Although embodiments have been illustrated and described hereinabove, the disclosure is not limited to the abovementioned specific embodiments, but may be variously modified by those skilled in the art without departing from the gist of the disclosure as disclosed in the accompanying claims. These modifications should also be understood to fall within the scope and spirit of the disclosure.

What is claimed is:

1. An electronic device comprising:
a first housing comprising a display module including a display screen;
a second housing rotatable with respect to the first housing to define a rotation angle therebetween, the second housing comprising a first door provided at one surface and a second door provided at a surface which is opposite to the one surface;
a hinge unit configured to rotatably connect the first housing to the second housing; and
a driving module connecting the hinge unit to each of the first door and second door, the driving module moveable together with rotation of the second housing with respect to the first housing, to open and close the first door and the second door,
wherein the driving module is configured to:
open the first door when the rotation angle is less than a first angle;
open the second door when the rotation angle is greater than a second angle; and
open one door among the first and second doors, together with closing the other door among the first and second doors, while the rotation angle increases.

2. The electronic device of claim 1, wherein
the second housing comprises an input device connected to and moveable together with the second door, and
the driving module is configured to push the second door and the input device out of the second housing together.

3. The electronic device of claim 1, wherein
the electronic device which is supported by an external support, disposes in a direction in which the first door and the external support face each other the surface which is opposite to the one surface facing the external support, and
the driving module is configured to push and open the first door protruded out of the second housing and contacting the external support.

4. An electronic device comprising:
a first housing comprising a display module including a display screen;
a second housing rotatable with respect to the first housing to define a rotation angle therebetween, the second housing comprising a first door provided at one surface and a second door provided at a surface which is opposite to the one surface;
a hinge unit configured to rotatably connect the first housing to the second housing; and
a driving module connecting the hinge unit to each of the first door and second door, the driving module moveable together with rotation of the second housing with respect to the first housing, to open and close the first door and the second door,
wherein
the driving module is configured to:
open the first door when the rotation angle is less than a first angle;
open the second door when the rotation angle is greater than a second angle; and
close the first door and the second door when the rotation angle is the first angle; and
the first angle is substantially the same as the second angle.

5. An electronic device comprising:
a first housing comprising a display module including a display screen;
a second housing rotatable with respect to the first housing to define a rotation angle therebetween, the second housing comprising a first door provided at one surface and a second door provided at a surface which is opposite to the one surface;
a hinge unit configured to rotatably connect the first housing to the second housing; and
a driving module connecting the hinge unit to each of the first door and second door, the driving module moveable together with rotation of the second housing with respect to the first housing, to open and close the first door and the second door,
wherein
the driving module is configured to:
open the first door when the rotation angle is less than a first angle;
open the second door when the rotation angle is greater than a second angle;
close the second door when the rotation angle is less than the first angle; and
close the first door when the rotation angle is greater than the second angle; and
the first angle is less than the second angle.

6. The electronic device of claim 5, wherein the driving module is configured to open the first door and the second door when the rotation angle is between the first angle and the second angle.

7. An electronic device comprising:
a first housing comprising a display module including a display screen;
a second housing rotatable with respect to the first housing to define a rotation angle therebetween, the second housing comprising a first door provided at one surface and a second door provided at a surface which is opposite to the one surface;
a hinge unit configured to rotatably connect the first housing to the second housing; and
a driving module connecting the hinge unit to each of the first door and second door, the driving module moveable together with rotation of the second housing with respect to the first housing, to open and close the first door and the second door,
wherein
the first housing and the first door facing each other defines the rotation angle as a start angle,
the first housing and the second door facing each other defines the rotation angle as an end angle, the driving module is configured to:
open the first door when the rotation angle is less than a first angle;
open the second door when the rotation angle is greater than a second angle;
close the first door and the second door when the rotation angle is the start angle; and
close the first door and open the second door when the rotation angle is the end angle.

8. An electronic device comprising:
a first housing comprising a display module including a display screen;
a second housing rotatable with respect to the first housing to define a rotation angle therebetween, the second housing comprising a first door provided at one surface and a second door provided at a surface which is opposite to the one surface;
a hinge unit configured to rotatably connect the first housing to the second housing; and
a driving module connecting the hinge unit to each of the first door and second door, the driving module moveable together with rotation of the second housing with respect to the first housing, to open and close the first door and the second door,
wherein
the driving module is configured to:
open the first door when the rotation angle is less than a first angle; and
open the second door when the rotation angle is greater than a second angle; and
the driving module comprises:
a gear rotatable by interoperating with the hinge unit;
a shaft offset from a rotation axis of the gear, and comprising a shaft arm; and
a support member comprising a slot along which the shaft arm moves together with rotation of the gear, the support member being connected to the first door and the second door.

9. The electronic device of claim 8, wherein the shaft arm is configured to compress the slot and push the support member, together with the rotation of the gear.

10. The electronic device of claim 8, wherein the driving module comprises:
a first gear rotating in one direction by interoperating with the hinge unit; and
a second gear rotating in a direction opposite to the first gear by engaging with the first gear.

11. The electronic device of claim 8, wherein the driving module comprises:
a first shaft arm and a second shaft arm moving by interoperating with the hinge unit;
a first support member comprising a first slot along which the first shaft arm moves, the first support member being pressed by the first shaft arm to push the first door from the second housing; and
a second support member comprising a second slot along which the second shaft arm moves, the second support member being pressed by the second shaft arm to push the second door from the second housing.

12. The electronic device of claim 11, wherein
the first slot comprises a first inflection region in which a movement direction of the first shaft arm changes, and
the first inflection region corresponds to the rotation angle substantially equal to the first angle.

13. The electronic device of claim 11, wherein
the second slot comprises a second inflection region in which a movement displacement of the second shaft arm changes, and
the second inflection region corresponds to the rotation angle substantially equal to the second angle.

14. An electronic device comprising:
a housing comprising:
a first housing comprising a first surface and a second surface which is opposite to the first surface,
a second housing comprising a third surface and a fourth surface which is opposite to the third surface and respectively corresponding to the first surface and the second surface of the first housing,
a first door openable and closeable at the third surface of the second housing, and
a second door openable and closeable at the fourth surface of the second housing;
a hinge unit configured to rotatably connect the first housing to the second housing, and adjust a rotation angle between the first housing and the second housing; and
a driving module configured to open the first door when the rotation angle is less than a first angle, and open the second door when the rotation angle is greater than a second angle, the second angle being equal to or greater than the first angle,
wherein
the first housing and the second housing rotated to dispose the first surface and the fourth surface facing each other defines the rotation angle as a start angle,
the first housing and the second housing rotated to dispose the second surface and the third surface facing each other defines the rotation angle as an end angle, and
the driving module is further configured to:
close the first door and the second door at the start angle; and
close the first door and open the second door at the end angle.

15. The electronic device of claim 14, wherein the driving module is configured to alternately open the first door and the second door as the rotation angle increases.

16. An electronic device comprising:
a housing comprising:
a first housing comprising a first surface and a second surface which is opposite to the first surface,
a second housing comprising a third surface and a fourth surface which is opposite to the third surface and respectively corresponding to the first surface and the second surface of the first housing,
a first door openable and closeable at the third surface of the second housing, and
a second door openable and closeable at the fourth surface of the second housing;
a hinge unit configured to rotatably connect the first housing to the second housing, and adjust a rotation angle between the first housing and the second housing; and
a driving module configured to open the first door when the rotation angle is less than a first angle, and open the second door when the rotation angle is greater than a second angle, the second angle being equal to or greater than the first angle;
wherein
the first housing and the second housing rotated to dispose the first surface and the fourth surface facing each other defines the rotation angle as a start angle;

the first housing and the second housing rotated to dispose the second surface and the third surface facing each other defines the rotation angle as an end angle; and the driving module is further configured to:
    open the first door and close the second door when the rotation angle is between the start angle and the first angle; and
    close the first door and open the second door when the rotation angle is between the second angle and the end angle.

17. The electronic device of claim 16, wherein the driving module is configured to alternately open the first door and the second door as the rotation angle increases.

18. An electronic device comprising:
a housing comprising:
    a first housing comprising a first surface and a second surface which is opposite to the first surface,
    a second housing comprising a third surface and a fourth surface which is opposite to the third surface and respectively corresponding to the first surface and the second surface of the first housing,
    a first door openable and closeable at the third surface of the second housing, and
    a second door openable and closeable at the fourth surface of the second housing;
a hinge unit configured to rotatably connect the first housing to the second housing, and adjust a rotation angle between the first housing and the second housing; and
a driving module configured to open the first door when the rotation angle is less than a first angle, and open the second door when the rotation angle is greater than a second angle,
wherein
the first angle is substantially the same as the second angle, and
the driving module is further configured to close the first door and the second door when the rotation angle is the first angle.

19. The electronic device of claim 18, wherein the driving module is configured to alternately open the first door and the second door as the rotation angle increases.

\* \* \* \* \*